United States Patent
Cornwell

(10) Patent No.: US 6,698,446 B2
(45) Date of Patent: Mar. 2, 2004

(54) CHECK VALVE

(75) Inventor: James P. Cornwell, Erie, PA (US)

(73) Assignee: R. Conrader Company, Erie, PA (US)

( * ) Notice: Subject to any disclaimer, the term of this patent is extended or adjusted under 35 U.S.C. 154(b) by 47 days.

(21) Appl. No.: 10/194,528

(22) Filed: Jul. 12, 2002

(65) Prior Publication Data

US 2004/0007261 A1 Jan. 15, 2004

(51) Int. Cl.[7] .................... F16K 21/10; F04B 49/035
(52) U.S. Cl. ..................... 137/115.16; 137/115.15; 137/115.24; 137/514.5; 251/64; 417/299
(58) Field of Search ................. 137/115.05, 115.06, 137/115.15, 115.16, 115.24, 115.28, 514.5, 514.7; 251/64; 417/299

(56) References Cited

U.S. PATENT DOCUMENTS

| | | | |
|---|---|---|---|
| 1,215,071 A | * 2/1917 | Steedman | 417/299 |
| 1,850,117 A | * 3/1932 | McMillan | 137/115.05 |
| 2,041,906 A | 5/1936 | Czarnecki | 277/20 |
| 2,318,963 A | 5/1943 | Parker | 251/148 |
| 2,554,390 A | 5/1951 | Stevenson | 137/153 |
| 3,085,588 A | * 4/1963 | Oliphant et al. | 137/115.16 |
| 3,358,705 A | 12/1967 | Krechel | 137/116 |
| 3,871,397 A | 3/1975 | Larsen | 137/115 |
| 3,967,635 A | 7/1976 | Sealfon et al. | 137/102 |
| 3,976,090 A | 8/1976 | Johnson | 137/117 |
| 3,999,568 A | 12/1976 | Chapman | 137/116 |
| 4,237,918 A | 12/1980 | German | 137/116 |
| 4,321,940 A | 3/1982 | Krechel et al. | 137/116 |
| 4,470,428 A | 9/1984 | Bishop et al. | 137/116 |
| 4,638,831 A | 1/1987 | Lindgren | 137/117 |
| 4,877,378 A | 10/1989 | Saggers | 417/299 |
| 4,941,502 A | 7/1990 | Loos et al. | 137/116 |
| 4,948,091 A | 8/1990 | Satoh et al. | 251/65 |
| 5,058,618 A | 10/1991 | Bacardit | 137/116 |
| 5,236,002 A | 8/1993 | Martin et al. | 137/119 |
| 5,409,032 A | 4/1995 | Berfield | 137/117 |
| 6,050,544 A | 4/2000 | Meronek | 251/149.6 |
| 6,131,606 A | 10/2000 | O'Neill | 137/495 |
| 6,186,477 B1 | 2/2001 | McCombs et al. | 251/323 |
| 6,202,691 B1 | 3/2001 | Smith | 137/614.04 |
| 6,296,017 B2 | 10/2001 | Kimizuka | 137/625.17 |

\* cited by examiner

*Primary Examiner*—John Rivell
(74) *Attorney, Agent, or Firm*—Edward W. Goebel, Jr.; Jon L. Woodard; MacDonald, Illig, Jones & Britton LLP

(57) ABSTRACT

A check valve with an elongated body and a hole extending from an inlet end to an outlet end. A piston assembly is mounted within the body and can include a piston, a check valve seal and a piston spring. The piston spring biases the piston to a first piston location preventing air from flowing from the inlet toward the outlet end. The check valve seal can be positioned on the piston assembly to seal against either a check valve seat or the inside diameter of the hole to restrict air flow when the piston is in the first piston location. Movement of the piston to a downstream piston location can remove the check valve seal from the check valve seat and/or from the inside diameter of the hole, allowing air to flow from the inlet end toward to outlet end.

134 Claims, 13 Drawing Sheets

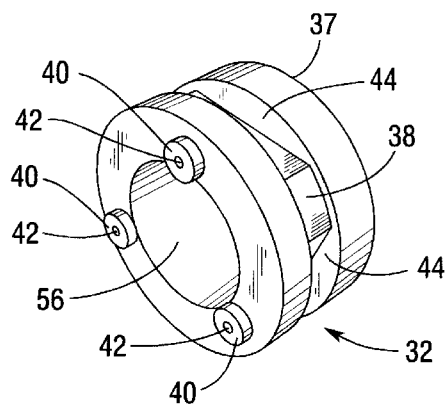
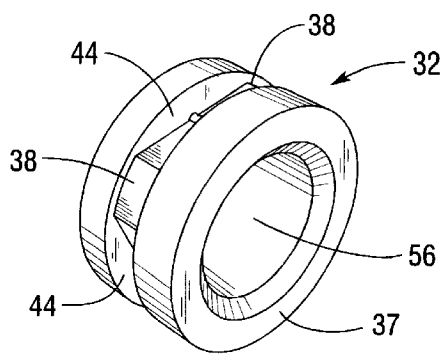
*Fig.14A*  *Fig.14B*
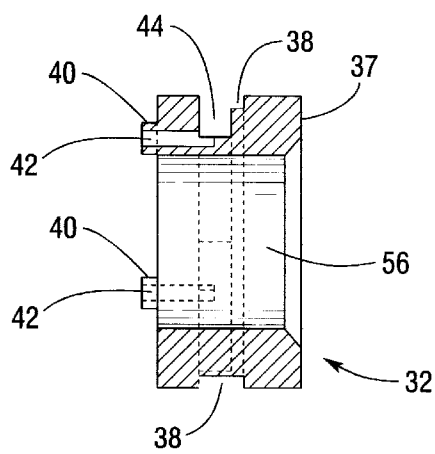
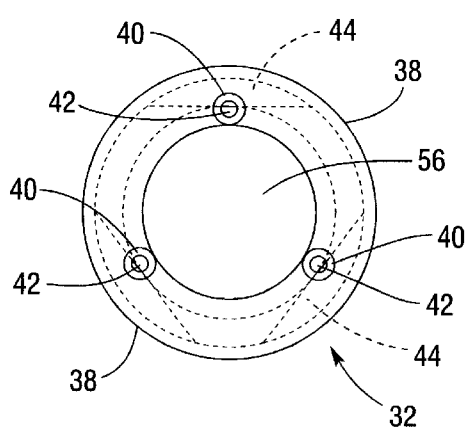
*Fig.14C*  *Fig.14D*

CHECK VALVE

BACKGROUND

An air compressor system is often pressurized with a motor driven compressor controlled by a pressure-operated switch that senses pressure in an air receiver such as a pressure vessel. The compressor forces compressed air through a discharge tube and a check valve which is connected to a pressure vessel, the pressure vessel serving as a reservoir for storing the compressed air. When the pressure of the compressed air being produced and stored in the pressure vessel reaches a preselected maximum level, the pressure switch shuts off the compressor motor to stop further pressurization. The lack of pressure from the compressor allows the check valve to close, preventing air from flowing from the air receiver back into the discharge tube when pressurization stops. However, pressurized air may still remain in the discharge tube and in the head of the compressor.

As air is consumed from the pressure vessel, the level of pressure remaining within the pressure vessel is reduced. When the pressure in the pressure vessel falls to a preselected minimum level, the pressure switch again operates the compressor to resume pressurization. However, if the remaining pressure in the discharge tube and in the head of the compressor is not removed prior to resuming pressurization, the compressor must overcome the added load from this remaining pressure in addition to the load of initiating pressurization. This can result in adverse system effects on the compressor motor such as motor stalling or electrical circuit overloading in the circuit in which the motor is installed.

To prevent this, an unloader valve is operated by the pressure switch to relieve the pressure from the discharge tube when the pressure within the pressure vessel rises to a preselected maximum pressure level. Typically, the unloader valve is connected to the discharge tube through an additional hose, tubing, or other mechanical communication means.

One problem which exists with this type of unloading configuration is that it will typically fail to unload the discharge tube and compressor head when the pressurization is interrupted by means other than the pressure switch. For example, in the event of a power failure or when a compressor is unplugged during operation so that the predetermined pressure threshold recognized by the pressure switch is not reached, unloading will not occur. This can leave back pressure on the discharge tube when pressure in the pressure vessel is less than the predetermined threshold value.

In operation, many air compressors are configured to effect pressurization with compression cylinders or other pulsating mechanisms. Such mechanisms effectively establish high pressure conditions within the discharge tube and the head of the compressor to pressurize the pressure vessel. However, the pulsating action of such mechanisms can also lead to pressure pulsations which adversely affect the operation of the check valve. For example, if the check valve incorporates a spring-biased piston assembly, pressure pulsations from the compressor motor can cause one or more components of the piston assembly to reciprocate in response to the pressure pulsations, possibly leading to undesired vibration and check valve damage.

SUMMARY

The invention is a check valve for installation between a compressor and an air receiver in an air compressor system. The check valve has an elongated body having a hole extending from an inlet end to an outlet end of the check valve.

An air bleed aperture can extend through the body and can be adjacent a groove extending around the circumference of a valve seat assembly mounted within the hole. The valve seat assembly can have a check valve seat facing the outlet end of the body, and a plurality of raised unloader seating elements extending toward the inlet end of the body, and can include a passage from the groove toward the inlet end. An unloader valve seal can be reciprocally mounted to slide within the hole of the check valve between unloader seating elements of the valve seat assembly and the inlet end of the body. A piston assembly mounted within the body can include a piston, a check valve seal, and a piston spring. The piston spring biases the piston to a first piston location that is toward the inlet end of the body which prevents air from flowing from the inlet end toward the outlet end of the valve body. The check valve seal can be positioned on the piston assembly to contact and seal against either the check valve seat of the valve seat assembly or the inside diameter of the hole extending through the check valve body to prevent air flow when the piston is in the first piston location.

The piston assembly can force the unloader valve seal away from the unloader seating elements when the piston is in the first piston location, permitting air to flow from the inlet end of the body to the air bleed aperture. When the air compressor produces sufficient air pressure at the inlet end of the body to force the piston from the first piston location to any of a plurality of downstream piston locations, the unloader valve seal becomes free to slide downstream to contact and seal the unloader seating elements, thereby preventing air from flowing from the inlet end of the body through the air bleed aperture. Movement of the piston from the first piston location to a downstream piston location can also remove the check valve seal from the check valve seat and/or from the inside diameter of the hole extending through the check valve body, allowing air to flow from the inlet end toward the outlet end of the valve body.

The hole extending through the body of the check valve may include a tapered portion having a first inner diameter and at least a second larger inner diameter, the first inner diameter being closer to the inlet end of the check valve than the second inner diameter. A clearance space exists between the check valve seal and the tapered portion of the inner diameter of the hole when the piston moves to a downstream piston location, permitting a level of air flow from the inlet end of the valve body toward the outlet end of the valve body. The clearance space between the valve seal and tapered portion of the inner diameter of the valve body can be greater when the piston is at a first downstream location that is farther away from the inlet end of the valve body than when the piston is at a second downstream location that is closer to the inlet end of the valve body. As a result, the level of air that is permitted to flow from the inlet end of the valve body toward the outlet end of the valve body can be greater when the piston is at the first downstream location than when the piston is at the second downstream location, allowing the check valve to be used with air compressors having different volume output levels.

A dampener may be attached to the outlet end of the valve body. The piston assembly includes a first bumper positioned to remain inside the hole of the valve body. A valve body clearance is maintained between the first bumper and the inside diameter of the hole of the valve body. The piston assembly also includes a second bumper positioned to remain inside the inside diameter of the dampener. Together, the first and second bumpers serve to minimize wear on the piston assembly during operation of the check valve. The piston assembly further includes a dampener seal which may comprise the second bumper or a separate component and which seals the clearance between the piston assembly and the inside diameter of the dampener. A dampener orifice is included with the dampener to restrict the amount of air that can enter the dampener to dampen the movement of the piston.

Those skilled in the art will realize that this invention is capable of embodiments which are different from those shown and that details of the structure of the unloader check valve can be changed in various manners without departing from the scope of this invention. Accordingly, the drawings and descriptions are to be regarded as including such equivalent unloader check valves as do not depart from the spirit and scope of this invention.

BRIEF DESCRIPTION OF THE DRAWINGS

For a more complete understanding and appreciation of this invention and many of its advantages, reference should be made to the following, detailed description taken in conjunction with the accompanying drawings wherein:

FIG. 14A is a perspective view of a valve seat assembly according to one embodiment of the invention;

FIG. 14B is a perspective view of the valve seat assembly of FIG. 14A;

FIG. 14C is a side cross sectional view of the valve seat assembly of FIG. 14A;

FIG. 14D is a front view of the valve seat assembly of FIG. 14A;

DETAILED DESCRIPTION

Figure 1:
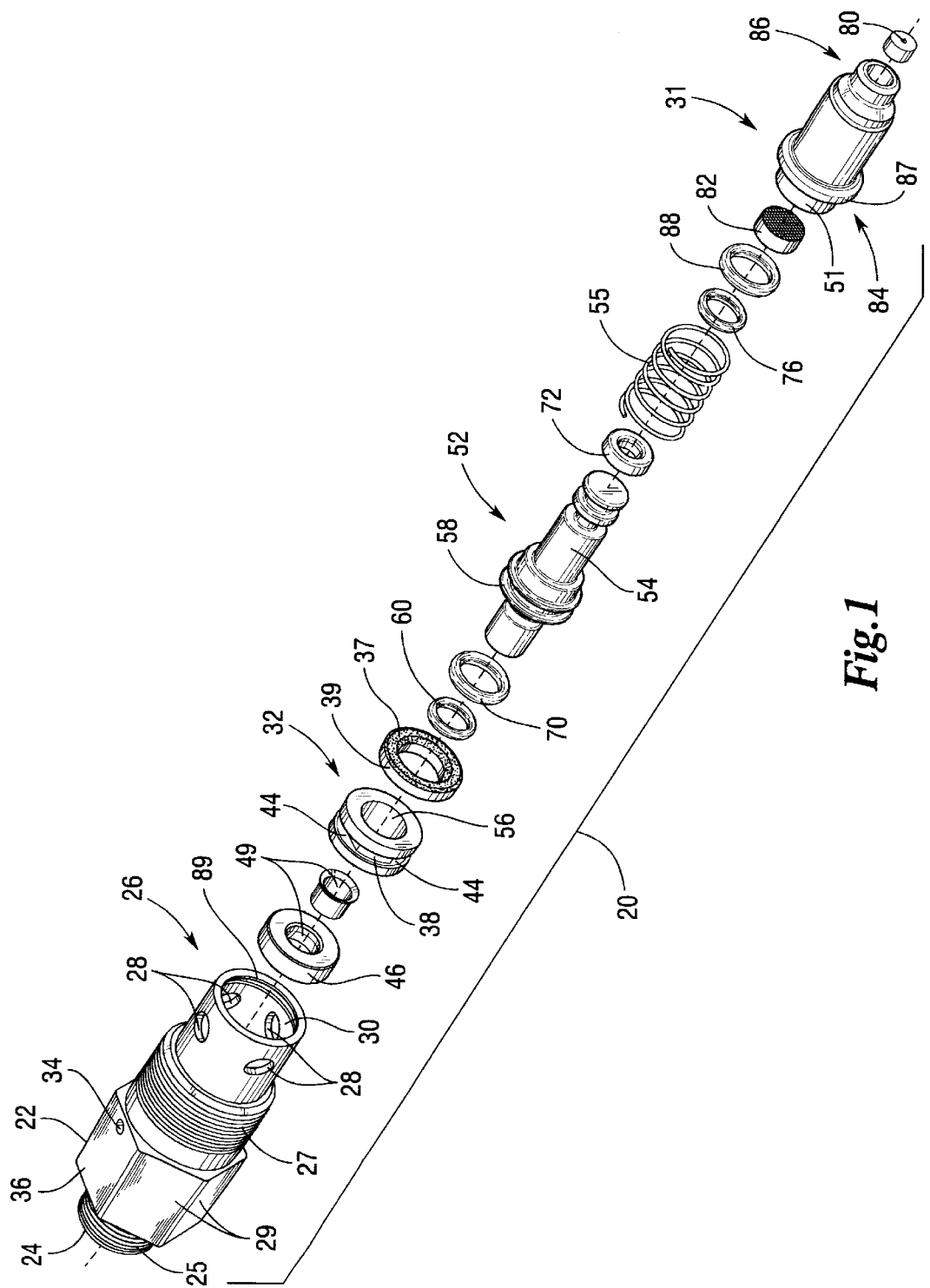
FIG. 1 is an exploded view of an unloader check valve according to one embodiment of the invention.

Referring to the drawings, identical reference numerals are used to designate the same or corresponding parts throughout the several embodiments and figures shown and described. In some figures, check valve seats 37 are darkened in cross sectional views and, depending on the specific embodiment, can comprise separate components or portions of other components, as indicated below and in the several figures.

FIG. 1 is an exploded view depicting the components of an embodiment unloader check valve 20 of the invention. Referring to the cross sectional view of the same check valve 20 in FIG. 2A, the check valve 20 includes an elongated valve body 22 having an inlet end 24 and an outlet end 26. The check valve 20 is configured to be interpositioned in an air compressor system between an air compressor (not shown) and pressure vessel (not shown). The air compressor is normally connected to the inlet end 24 of the check valve 20 with an inlet line (not shown) connected at inlet threads 25. The outlet end 26 of the check valve 20 includes outlet vents 28 that are configured to feed air to the air receiver (not shown) of the pressure vessel, the air receiver being secured to the check valve 20 via outlet threads 27. A hexagonal arrangement of tool engagement surfaces 29 allows for the use of a wrench or similar tool for installing the check valve 20 by the inlet threads 25 and outlet threads 27. A hole 30 extends through the valve body 22, extending from the inlet end 24 to the outlet end 26 and creating a general path for pressurized air to flow through the valve body 22.

Figure 2A:
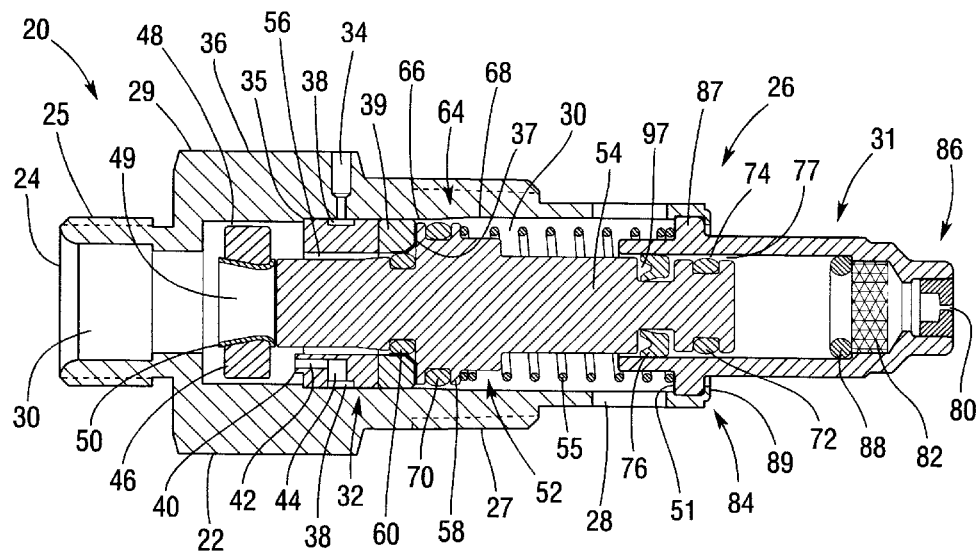
FIG. 2A is a cross sectional view of the assembled unloader check valve of FIG. 1 depicting a piston at a first piston location.
Figure 2B:
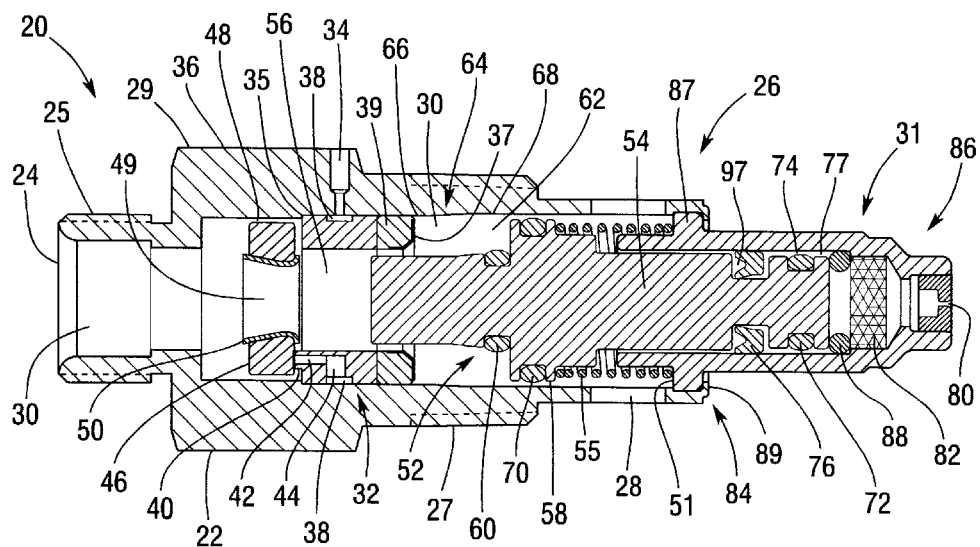
FIG. 2B is a cross sectional view of the assembled unloader check valve of FIG. 1 depicting the piston at a downstream piston location.

A valve seat assembly 32 is positioned within the hole 30 adjacent an air bleed aperture 34, the air bleed aperture 34 extending from the hole 30 to the exterior 36 of the valve body 22. As shown in FIGS. 2A and 2B and with reference to the exploded view of FIG. 1, the valve seat assembly 32 can be compression fitted into position within the hole 30 by inserting the valve seat assembly 32 through the outlet end 26 of the valve body 22 after the installation of an unloader valve seal 46 and prior to the installation of other components. When installed, the valve seat assembly 32 rests against a fitting ridge 35 within the hole 30 of the valve body 22. The valve seat assembly 32 includes a check valve seat 37 which is positioned on the side of the valve seat assembly 32 that is nearest the outlet end 26 of the valve body 22. As shown in the embodiment depicted in FIGS. 2A and 2B, the check valve seat 37 can, in some embodiments, comprise a separate washer component 39 that is then coupled to the rest of the valve seat assembly 32.

The valve seat assembly 32 is depicted alone in FIGS. 14A–D. As shown, a groove 38 extends around the circumference of the valve seat assembly 32. The valve seat assembly 32 is shown installed in a hole 30 of a valve body 22 in FIGS. 13A and 13B. When installed in the valve body 22, the valve seat assembly 32 is positioned so that the groove 38 is adjacent the air bleed aperture 34. As best understood by comparing FIGS. 13A and 13B with FIGS. 14A–D, the valve seat assembly 32 includes a number of raised unloader seating elements 40 which extend from the valve seat assembly 32 toward the inlet end 24 of the valve body 22. An air passage 42 extends from each seating element 40 into the valve seat assembly 32. The groove 38 has a separate notch portion 44 leading to each air passage 42 which allows the communication of air between each air passage 42 and the air bleed aperture 34.

Figure 13A:
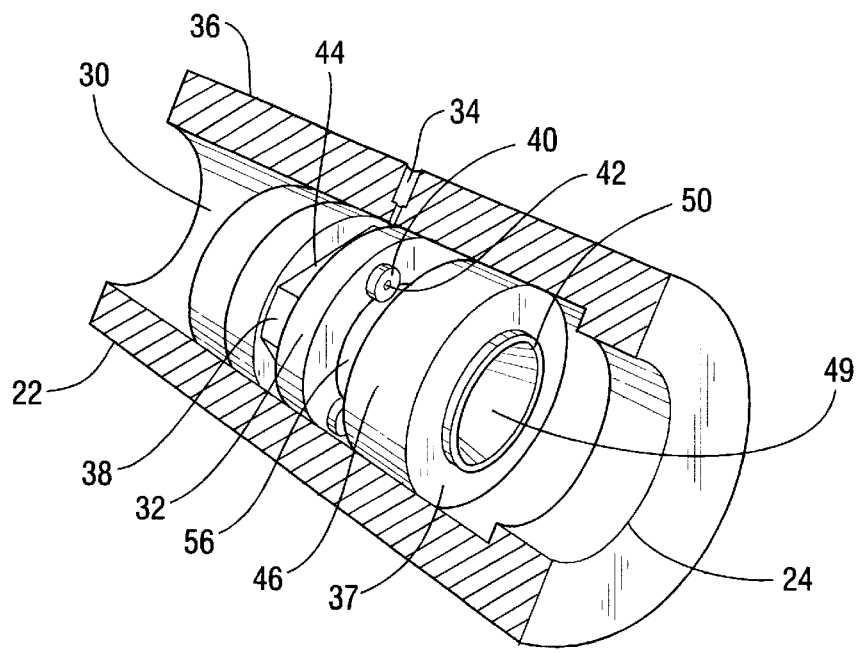
FIG. 13A is a perspective view of a valve seat assembly and unloader valve seal positioned within a valve body according to one embodiment of the invention.
Figure 13B:
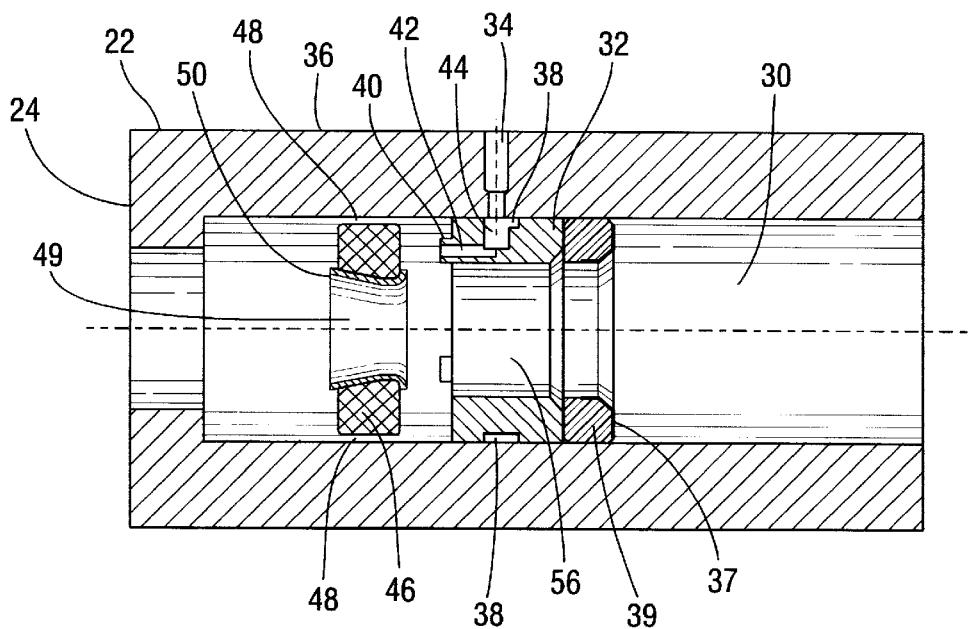
FIG. 13B is a cross sectional view of the valve seat assembly and unloader valve seal positioned within the valve body of FIG. 13A.

Referring to FIGS. 13A ad 13B, along with FIGS. 2A and 2B, an unloader valve seal 46 is reciprocally positioned within the hole 30 of the valve body 22 between the inlet end 24 of the valve body 22 and the valve seat assembly 32. The unloader valve seal 46 can be constructed of rubber, plastic, Teflon, or other similar resilient material to minimize wear against the inside surfaces of the hole 30 of the valve body 22 while providing an adequate seal. The diameter of the unloader valve seal 46 is sufficiently is small to allow a pressure discharge gap 48 to exist between the unloader valve seal 46 and the inside diameter of the hole 30 of the valve body 22. The pressure discharge gap 48 permits the unloader valve seal 46 to reciprocate in directions that are toward the inlet end 24 of the valve body 22 and away from the inlet end 24, that is toward the valve seat assembly 32. The unloader valve seal 46 also includes a pressure hole 49 lined with an engagement collar 50 that extends approximately through the center of the unloader valve seal 46.

Figure 4A:
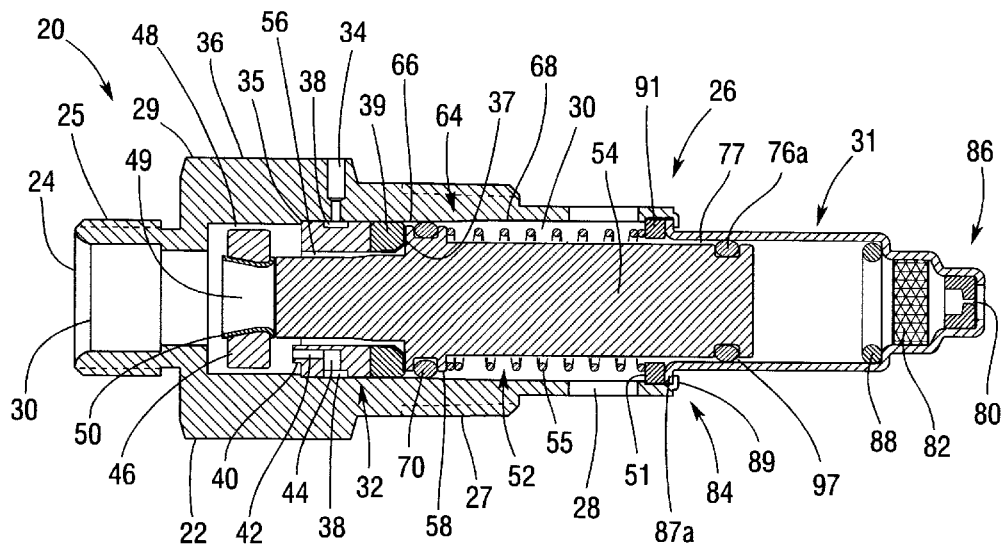
FIG. 4A is a cross sectional view of an unloader check valve according to an additional embodiment of the invention having a piston at a first piston location.
Figure 10:
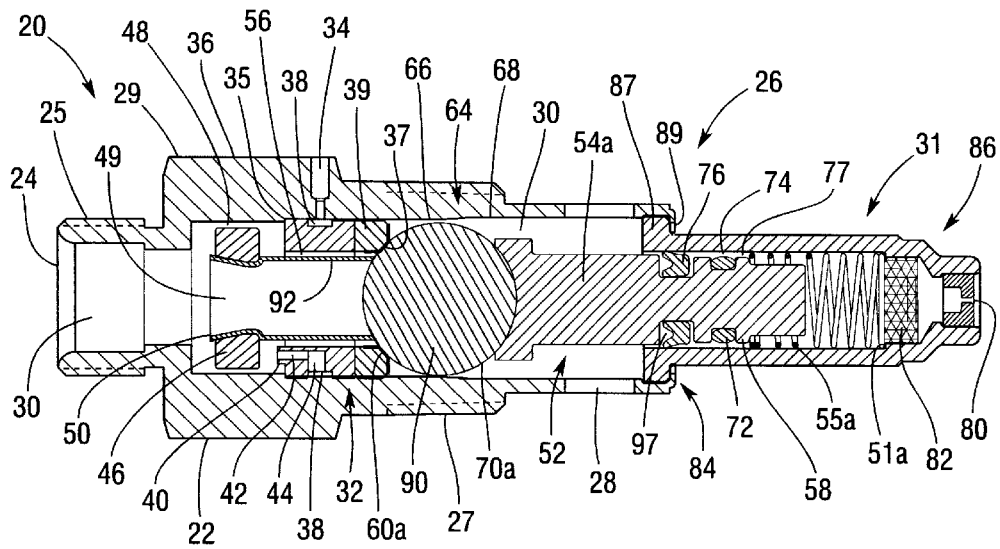
FIG. 10 is a cross sectional view of an unloader check valve according to an additional embodiment of the invention.

Referring again to FIG. 2A, a piston assembly 52 is constructed around a piston 54 which is biased to a first piston location (as shown in FIG. 2A) with a piston spring 55. The piston spring 55 is configured to exert compression forces between a spring seat 51 and a disk portion 58 of the piston 54. It will, however, be appreciated that the arrangement of the piston spring 55 and spring seat 51 can vary considerably within the contemplated scope of the invention. For example, in FIGS. 2A and B, the spring seat 51 is shown as being integral to a first end 84 of a dampener 31. Alternatively, as shown in the embodiments of FIGS. 4A and B, 5A and B, and 6A and B, a washer, snap ring or other seating element can be used. The piston spring 55 can also be positioned either partially or entirely outside of the valve body 22. For example, in the embodiment depicted in FIG. 10, the piston spring 55a is compressed between a disk portion 58 and spring seat 51a contained within the dampener 31. Other configurations of the piston spring 55 are also possible.

Referring again to FIG. 2A, when in the first piston location, the piston 54 extends through a piston hole 56 in the valve seat assembly 32 to contact the engagement collar 50 of the unloader valve seal 46. In contacting the engagement collar 50, the piston 54 holds the unloader valve seal 46 away from the seating elements 40 of the valve seat assembly 32. This leaves the air passages 42 of the seating elements 40 unobstructed. As a result, air pressure residing within the air inlet line is free to escape through the inlet end 24 of the valve body 22, through the pressure discharge gap 48 between the unloader valve seal 46 and inside surface of the hole 30. Air pressure can then continue to escape through air passages 42 of the seating elements 40 to the groove 38 of the valve seat assembly 32, and finally through the air bleed aperture 34 of the valve body 22 to the environment. This release of air pressure from the valve body 22 significantly reduces the amount of back pressure in the inlet line and valve body 22 that the compressor must work against at the start of operation.

After the start of operation of the compressor, it is desirable to restrict air pressure from escaping from within the valve body 22 so that the full magnitude of pressure within the inlet line is directed through the outlet vents 28 and toward the pressure vessel. Once the compressor begins to operate, the air pressure in the air receiver increases. The magnitude of pressure flowing from the inlet line into the inlet end 24 of the valve body 22 will generally be sufficient to force the piston 54 to compress the piston spring 55 and to move to one of a plurality of piston locations that are each downstream and further away from the inlet end 24 of the valve body 22 than the first piston location. An example of one such downstream piston location is the location of the piston 54 depicted in FIG. 2B. The exact location to which the piston 54 moves generally depends on the magnitude of air pressure flowing from the compressor into the inlet end 24 of the valve body 22.

As shown in FIG. 2B, as increased air pressure within the valve body 22 forces the piston 54 to a downstream piston location, the piston 54 no longer restricts movement of the unloader valve seal 46 away from the inlet end 24 of the valve body 22 toward the valve seat assembly 32. Air flowing from the inlet end 24 toward the outlet end 26 of the valve body 22 also forces the unloader valve seal 46 to move toward and contact the unloader seating elements 40 of the valve seat assembly 32, sealing the air passage 42 of each seating element 40 from the hole 30 of the valve body 22. As shown in FIG. 2B and in FIGS. 14A–D, some embodiments of the valve seat assembly 32 include three approximately equidistantly spaced seating elements 40 to allow for a three-point contact effect which tends to improve the overall effectiveness of the seal. Terminating the flow of air between the hole 30 and air bleed aperture 34 thus maximizes the amount of air pressure within the inlet line that is directed through the outlet vents 28.

Referring again to FIG. 2A when the compressor is not operating and the piston 54 is in a first position, the piston assembly 52 includes a check valve seal 60 positioned to seal against the check valve seat 37 and thereby seal the inlet line from the air compressor from the pressure vessel. The sealing action of the check valve seal 60 then allows the valve seat assembly 32 and air bleed aperture 34 to remove back pressure from the inlet line without draining pressure from the pressure vessel.

Once the compressor begins to operate and air pressure forces the piston 54 to a downstream position, air flows through the hole 30 extending through the valve body 22 past the check valve seal 60 in a clearance space 62 between the check valve seal 60 and valve body 22. However, if the inner diameter of the hole 30 were constant at multiple locations downstream from the valve seat assembly 32, an increase in the magnitude of the pressure output of the compressor would simply move the piston to a downstream piston location that is further away from the inlet end 24 of the valve body 22 without necessarily increasing the flow of air, possibly resulting in increased heat and back pressure in the system.

For this reason, referring again to FIGS. 2A and 2B, the hole 30 extending through the valve body 22 includes a tapered portion 64 having a first inner diameter 66 and a larger second inner diameter 68, the first inner diameter 66 being closer to the inlet end 24 of the valve body 22 than is the second inner diameter 68. Due to this configuration, the clearance space 62 between the check valve seal 60 and valve body 22 is greater when the piston 54 is at a downstream piston location that is farther away from the inlet end 24 of the valve body 22 than when the piston 54 is at a downstream piston location that is closer to the inlet end 24 of the valve body 22. As a result, the level of air that is permitted to flow through the check valve 20 is greater when the piston 54 is at a downstream piston location that is further away from the inlet end 24 of the valve body 22 than when the piston 54 is at a downstream piston location that is closer to the inlet end 24 of the valve body 22. This tapered valve body allows the check valve to be used with air compressors having different volume output levels.

In many air compressors, the volume output level of the air pressure produced may be subject to cyclical fluctuations due to the reciprocal operation of mechanical components within each compressor. When connected to a check valve 20 of the invention, these fluctuations will tend to cause reciprocation of the piston 54 to various positions within the hole 30 of the valve body 20.

Figure 3A:
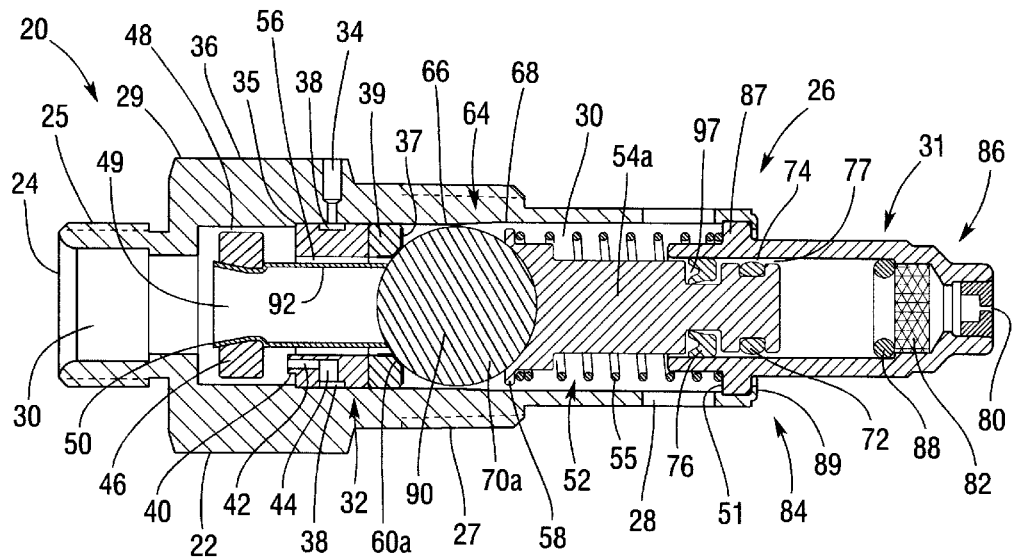
FIG. 3A is a cross sectional view of an unloader check valve according to another embodiment of the invention having a piston at the first piston location.

To reduce such fluctuations, a dampener 31 having a first end 84 and second end 86 is attached to the outlet end 26 of the valve body 20. The first end 84 of the dampener 31 is open to the outlet end 26 of the valve body 20 to permit the piston assembly 52 to extend into and remain inside the dampener 31 during operation. A dampener bumper 88 is positioned near the second end 86 of the dampener 31 to restrict movement of the piston assembly 52 when the piston 54 is moved to a downstream position that is furthest away from the inlet end 24 end of the valve body 22 (as shown in FIG. 2B) and to cushion contact between the piston assembly and the second end 86 of the dampener 31. The dampener 31 can be affixed to the outlet end 26 of the valve body 22 in a variety of ways. In FIGS. 2A and B, the first end 84 of the dampener 31 includes a dampener flange 87 that is integral to the structure of the dampener and which is inserted into the outlet end 26 of the valve body 22. The valve body 22 includes a formable shoulder 89 which can be spun inwardly with a lathe or other radial positioning tool to form the shoulder 89 so that it engages the dampener flange 87 to lock the valve body 22 into position. The dampener flange 87 can also form the spring seat 51. Similar shoulder arrangements are shown in FIGS. 3A and B, 8 and 10.

Figure 11:
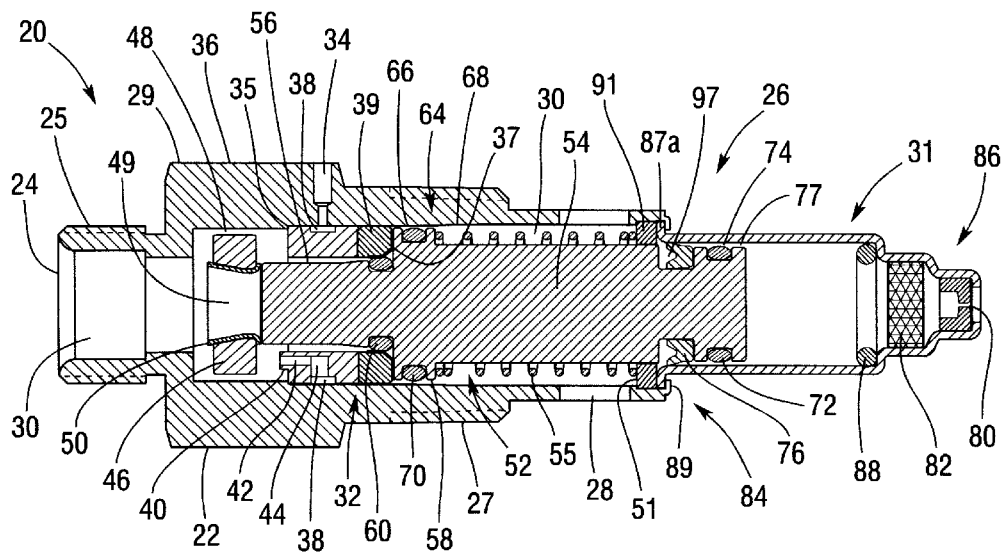
FIG. 11 is a cross sectional view of an unloader check valve according to another embodiment of the invention.
Figure 12:
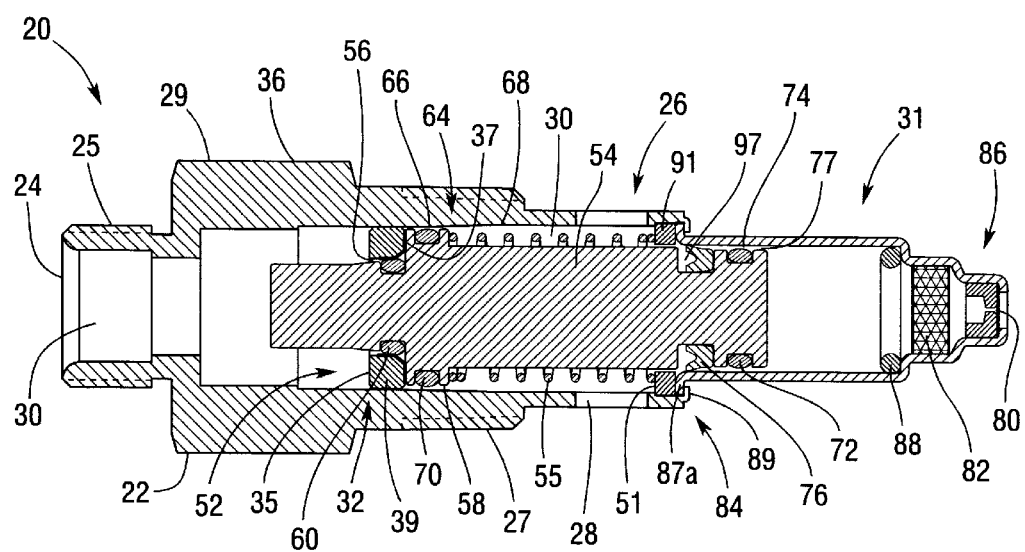
FIG. 12 is a cross sectional view of a check valve according to an additional embodiment of the invention.

Referring briefly to FIG. 11, an embodiment of the unloader check valve 20 is shown that is similar to the embodiment of FIGS. 2A and B except for the addition of a mounting washer 91 that is positioned within the hole 30 and near the inlet end 24 to the valve body 22. The mounting washer 91 can also serve as the spring seat 51 in this embodiment. To secure the first end 84 of the dampener 31 to the outlet end 26 of the valve body 22, a flared dampener flange 87a is inserted into the outlet end 26 to rest against the mounting washer 91. The formable shoulder 89 is then formed inwardly to lock the dampener 31 in position. Similar shoulder arrangements are shown in FIGS. 4A and B, 5A and B and 12.

Figure 6A:
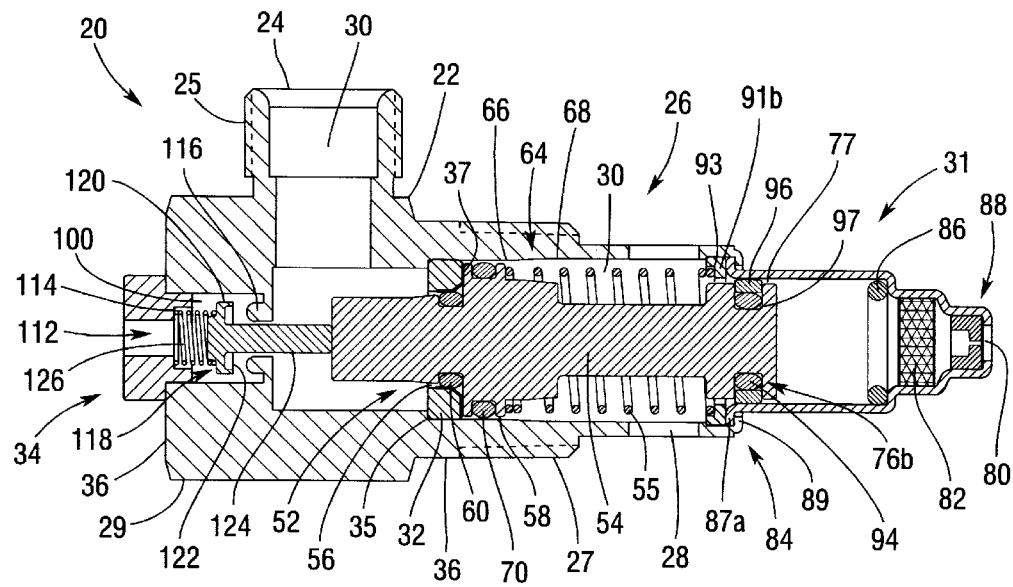
FIG. 6A is a cross sectional view of an unloader check valve according to an additional embodiment of the invention having a piston at a first piston location.
Figure 7A:
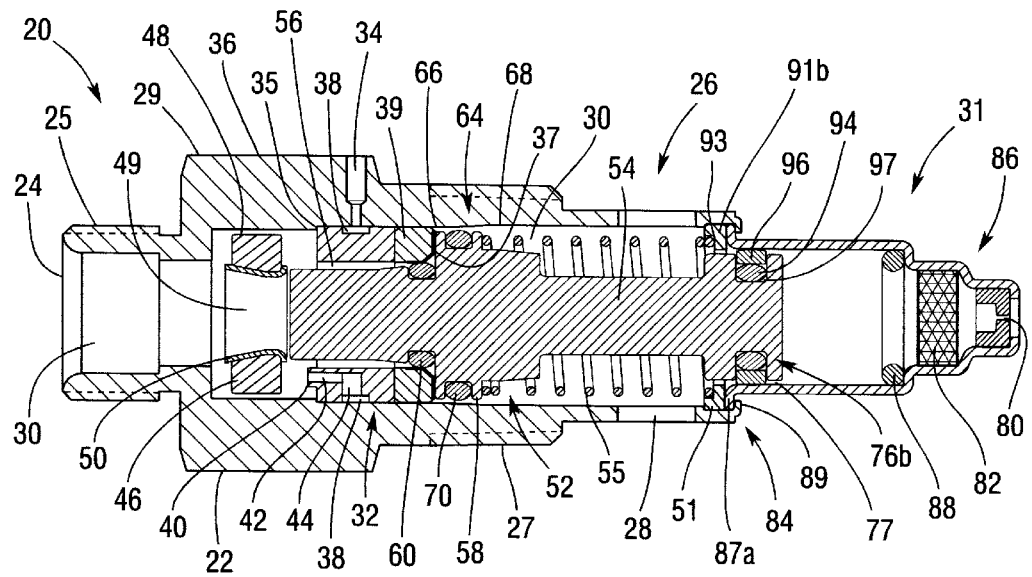
FIG. 7A is a cross sectional view of an unloader check valve according to another embodiment of the invention having a piston at a first piston location.
Figure 7B:
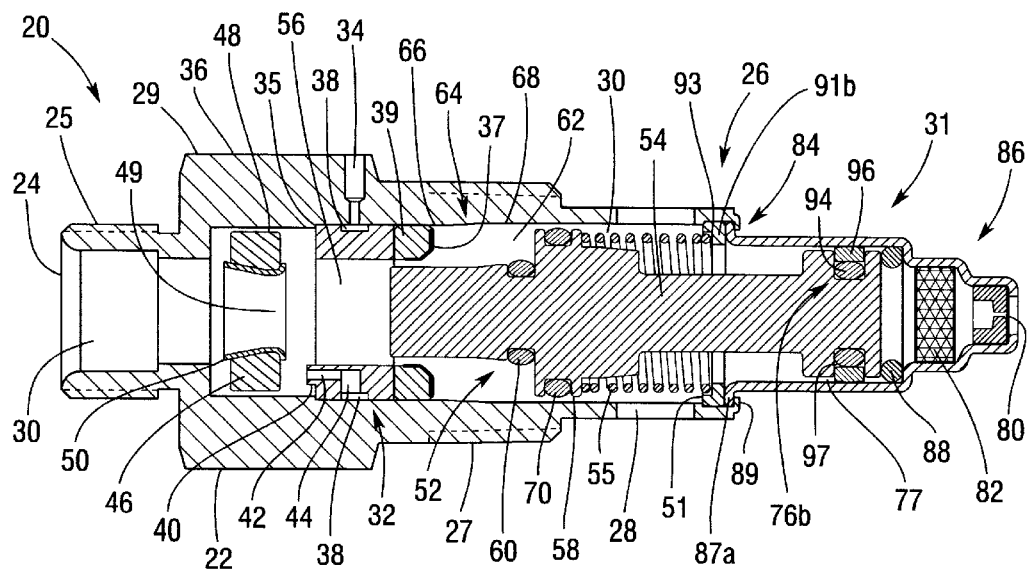
FIG. 7B is a cross sectional view of the unloader check valve of FIG. 7A, the piston being at a downstream piston location.
Figure 9:
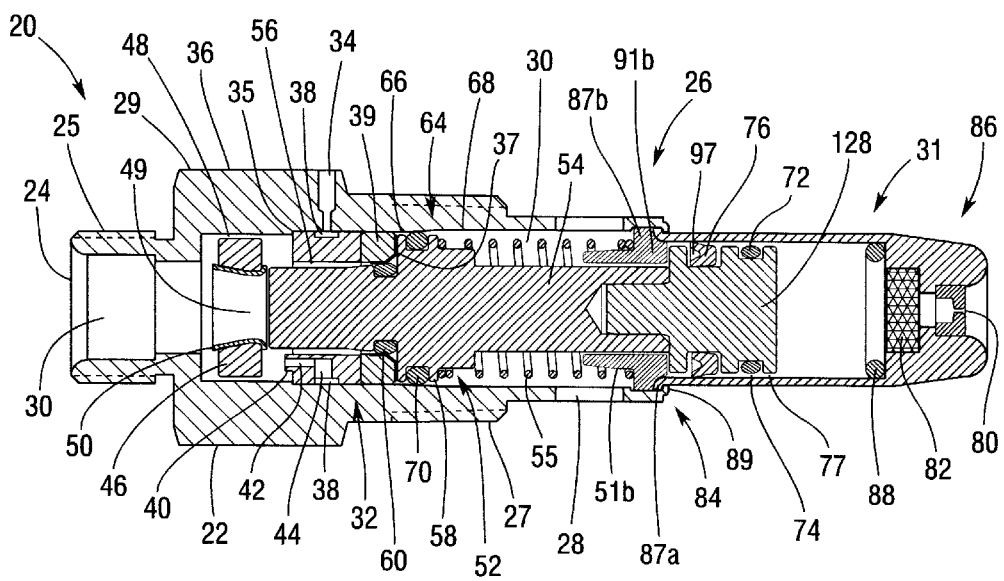
FIG. 9 is a cross sectional view of an unloader check valve according to another embodiment of the invention.

In some embodiments, such as those shown in FIGS. 6A and B and FIGS. 7A and B, a mounting washer 91b can include a relief section 93 at the spring seat 51 to accommodate and position the piston spring 55. Referring briefly to FIG. 9, a mounting washer 91b having an extended spring seat 51b and an integral dampener flange 87b.

Referring again to FIGS. 2A and 2B, the piston assembly 52 includes a first bumper 70 which is positioned to remain within the hole 30 of the valve body 22 to minimize wear from reciprocating or vibrational contact with the valve body 22. Wear from such contact can be further reduced with the addition of a lubricant between the first bumper 70 and valve body 22. Notwithstanding such contact, FIGS. 2A and 2B depict how the first bumper 70 still permits a sufficient amount of clearance with the valve body 22 to allow air pressure to flow between the check valve seal 60 and the outlet vents 28. Also as shown, the first bumper 70 can comprise a rubber o-ring or other elastic element which can, in some embodiments, be mounted on the disk portion 58 of the piston 54.

The piston assembly 52 also includes a second bumper 72 which is positioned to remain within the dampener 31 to minimize wear from reciprocating or vibrational contact with the dampener 31. As with the first bumper 70, wear from such contact between the second bumper 72 and dampener 31 can be further reduced with the addition of a lubricant.

Figure 15A:
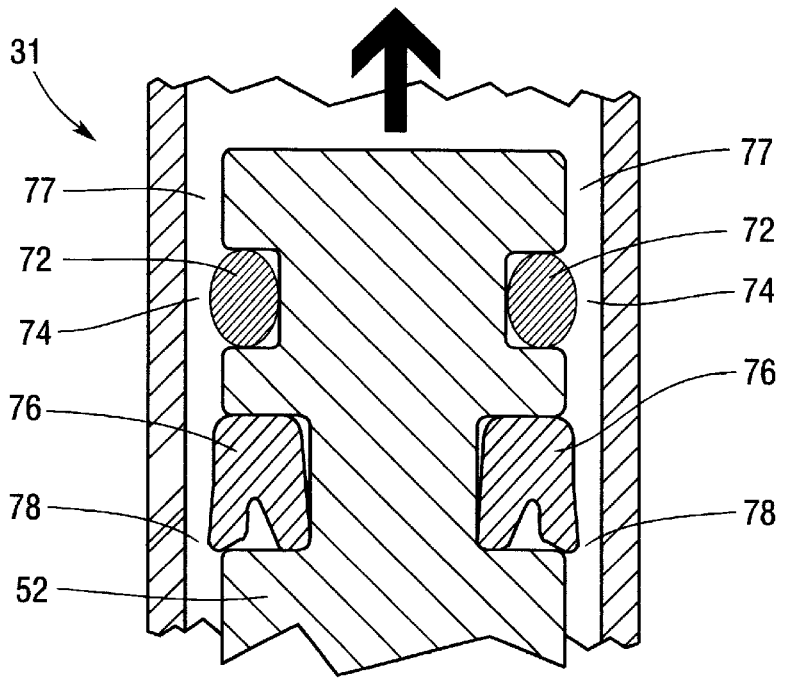
FIG. 15A is a magnified cross sectional view of a portion of a dampener of the unloader check valve of FIG. 2A, the piston assembly moving in the direction indicated by the arrow.
Figure 15B:
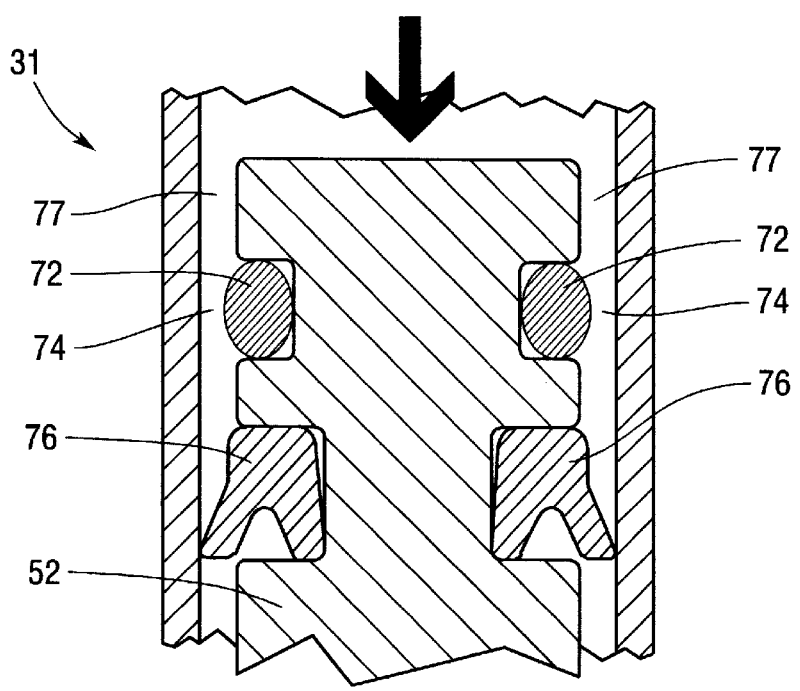
FIG. 15B is a magnified cross sectional view of a portion of a dampener of the unloader check valve of FIG. 2A, the piston assembly moving in the direction indicated by an arrow.

FIGS. 15A and B show magnified views of the piston assembly 52 and dampener 31 of FIGS. 2A and B. FIG. 15A depicts the piston assembly 52 as the piston 54 moves away from the inlet end 24 of the valve body 22 and FIG. 15B depicts the piston assembly 52 as the piston 54 moves toward the inlet end 24 of the valve body 22. In this embodiment, the second bumper 72 of the piston assembly 52 allows a sufficient second bumper clearance 74 from the inside diameter of the dampener 31 to permit air to freely pass by the second bumper 72 as the piston 54 moves away from and then toward the inlet end 24 of the valve body 22.

As best understood by a comparison of FIGS. 2A and B with FIGS. 15A and B, the piston assembly 52 of the depicted embodiment includes a dampener seal 76 having a c-shaped cross section. Although the embodiment shown includes a dampener seal 76 that is unidirectional in the form of a lip seal o-ring, it will be appreciated that other dampener seal configurations, including other unidirectional seal configurations, are also possible and are contemplated to be within the scope of the invention.

As shown in FIG. 15A, the depicted dampener seal 76 is configured to bend inwardly across its cross section under the force of passing air as the piston 54 moves away from the inlet end 24 of the valve body 22, allowing a seal clearance 78 with the inside surface of the dampener 31. When the piston 54 moves in this direction, air flow is not substantially impeded, preventing substantial compression of air within the dampener 31. Thus, significant dampening action does not occur as the piston 54 moves away from the inlet end 24 of the valve body 22 and toward the closed end of dampener 31.

Referring to FIG. 15B, when the piston 54 moves toward the inlet end 24 of the valve body 22, the dampener seal 76 bends outward across its cross section under the force of passing air, eliminating the seal clearance 78. This restricts the flow of air past the dampener seal 76.

As best understood by a comparison of FIGS. 2A and B, the dampener 31 further includes a narrow dampener orifice 80 and air filter 82, which in the illustrated embodiment, are positioned near the second end 86 of the dampener 31. As the piston 54 moves toward the inlet end 24 of the valve body 22, air cannot pass by the dampener seal 76 and is therefore drawn into the dampener 31 through the dampener orifice 80 and air filter 82, significantly limiting the speed at the which the piston 54 can move toward the inlet end 24 of the valve body 22. Thus, the embodiment depicted in FIGS. 2A and B and FIGS. 15A and B effects dampening action only when the piston 54 moves toward the inlet end 24 of the valve body 22.

Figure 8:
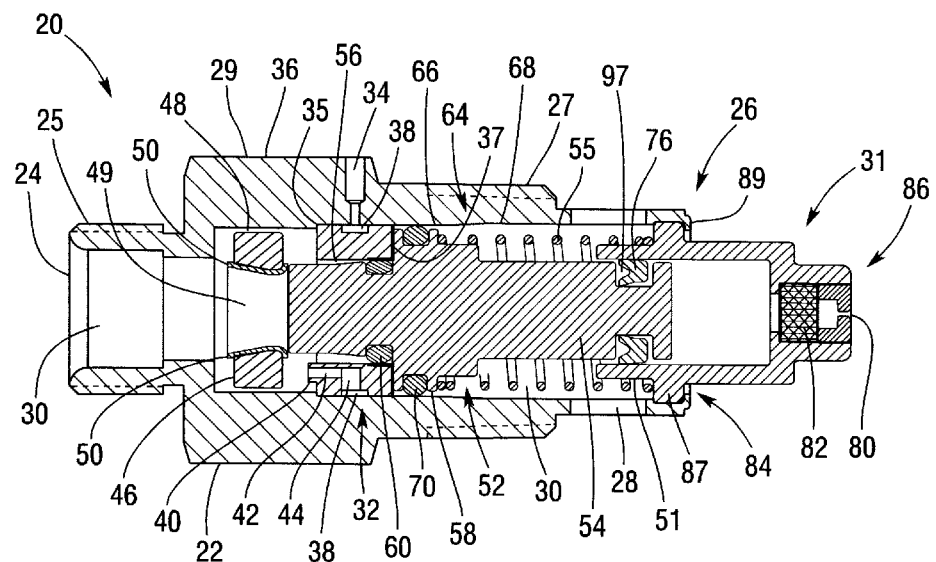
FIG. 8 is a cross sectional view of an unloader check valve according to an additional embodiment of the invention.

Although the embodiments of FIGS. 2A and B and FIGS. 15A and B each include a second bumper 72 for reducing vibrational wear, it will be appreciated that certain embodiments may omit the second bumper 72 and/or use the unidirectional seal 76 to perform a vibrational wear reducing function. Referring briefly to FIG. 8, a piston assembly 52 is shown in which no second bumper is present. In this embodiment, the unidirectional seal 76 performs both sealing and vibrational wear reducing functions. An additional lubricant may also be added to the dampener 31 to further reduce vibrational wear.

It will also be appreciated that alternate configurations of the piston assembly 52 are possible and are contemplated to be within the scope of the invention. For example, FIGS. 3A and B show an embodiment of the unloader check valve 20 in which the piston assembly 52 includes a ball 90 configured to serve as both a check valve seal 60a and first bumper 70a, the ball 90 being positioned to contact and seal against the check valve seat 37 when the piston 54a is in the first piston location and being further positioned to extend to prevent vibrational contact between the piston 54a and inside surface of the hole 30. The ball 90 can comprise rubber, Teflon, or other suitable material for sealing and for minimizing wear and vibrational contact between the valve body 22 and piston 54.

In the embodiment depicted in FIGS. 3A and B, an unloader sleeve 92 is reciprocally positioned to extend between the ball 90 and unloader valve seal 46 when the piston 54a is in the first position (as shown in FIG. 3A). As shown in the figures, the unloader sleeve 92 can be integral to the engagement collar 50 of the unloader valve seal 46 and can be configured to make contact with the ball 90 while the piston 54a is in the first piston location. In this position, the unloader sleeve 92 holds the unloader valve seal 46 away from the unloader seating elements 40 of the valve seat assembly 32. This allows air pressure to flow from the inlet end 24 of the valve body 22 to the air bleed aperture 34 while the ball 90 maintains air pressure within the pressure vessel by contacting check valve seat 37 and sealing the inlet end 24 of the valve body 22 from the outlet vents 28.

Figure 3B:
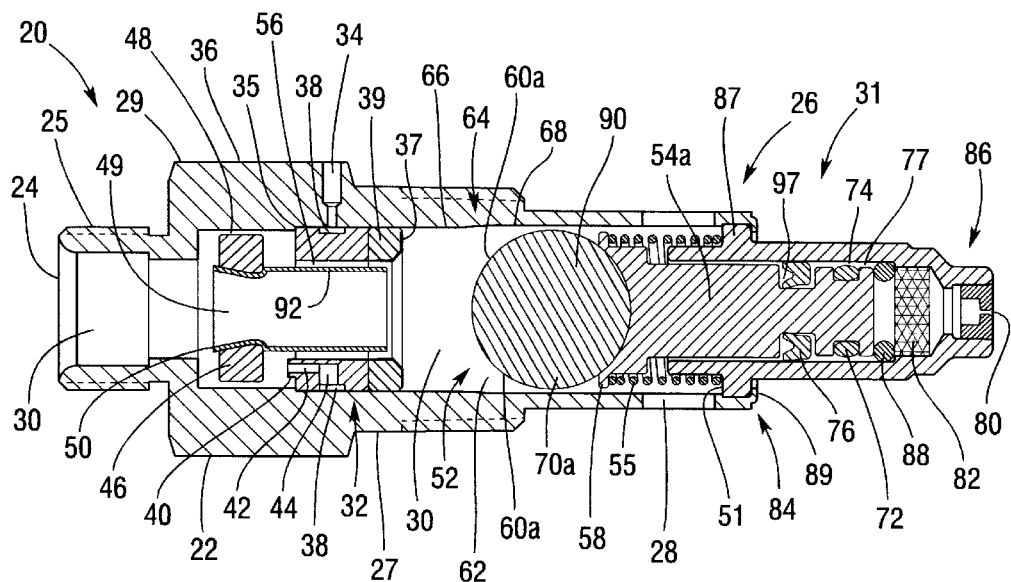
FIG. 3B is a cross sectional view of the unloader check valve of FIG. 3A, the piston being at a downstream piston location.

When the compressor is turned on, increased air pressure forces the ball 90 to push the piston 54a to a downstream position (as shown in FIG. 3B). This removes the ball 90 from contact with the unloader sleeve 92, allowing the unloader valve seal 46 to move to contact and seal against the unloader seating elements 40. Air is then free to flow from the inlet end 24 to the outlet vents 28 at the outlet end 26 of the valve body 22, passing through the clearance between the ball 90 and the internal surface of the valve body 22.

Figure 4B:
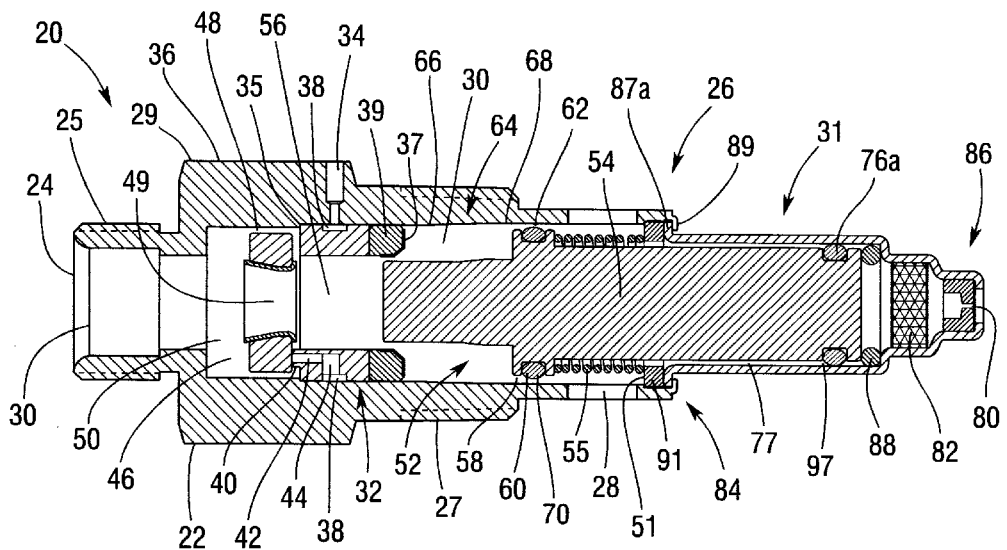
FIG. 4B is a cross sectional view of the unloader check valve of FIG. 4A, the piston being at a downstream piston location.

In some embodiments, the check valve seal 60 can also comprise the first bumper 70. Referring to FIGS. 4A and B, the first bumper 70 is configured to remove clearance with the valve body 22 when the piston 54 is in the first piston location (as shown in FIG. 4A), thereby sealing the inlet end 24 from the outlet end 26 of the valve body 22. Referring to FIG. 4B, when the compressor is turned on to increase air pressure and force the piston 54 to a downstream piston location, clearance is restored between the check valve seal 60 and valve body 22 due to the tapered portion 64 of the hole 30 extending through the valve body 22.

The embodiment depicted in FIGS. 4A and 4B also demonstrates how the piston assembly 52 can be modified to incorporate a dampener seal 76a that is a bidirectional seal and to eliminate the need for a second bumper 72. In the embodiment shown in FIGS. 4A and 4B, the dampener seal 76a comprises a flexible o-ring which extends the width of the cylinder clearance 77 so that no seal clearance exists between the piston assembly 52 and dampener 31. In this embodiment, the dampener seal 76a can comprise a material which is appropriate to minimize vibrational wear between the dampener 31 and piston assembly 52 and which may be combined with a lubricant to reduce friction during operation. Due to the circular or oval cross sectional shape of the dampener seal 76a in this embodiment, the dampener seal 76a eliminates seal clearance regardless of the direction in which the dampener seal 76a moves. Thus, this embodiment permits dampening action to occur when the piston 54 moves both toward and away from the inlet end 24 of the valve body 22. An additional lubricant may also be added to the dampener 31 to further reduce vibrational wear.

Referring now to FIGS. 6A and B and to FIGS. 7A and B, to further reduce vibrational wear, some embodiments can incorporate a second bumper 76b which can be a combination of a rubber or polymer compression ring 94 and a seal ring 96. The seal ring 96 comprises an extremely low-friction material such as Teflon. In such an arrangement, the compression ring 94 is positioned on the piston assembly 52 inside of the Teflon ring 96 within a dampener groove 97. The seal ring 96 is then compressed by the compression ring 94 between the piston assembly 52 and inside surface of the dampener 31. During operation, the material composition of the seal ring 96 tends to greatly reduce friction with the dampener 31 while the compression forces of the compression ring 94 against the piston assembly 52 and dampener 31 tend to preserve the shape of the seal ring 96, enhancing the sealing effect of the seal ring 96. Due to the constant sealing of the seal ring 96, dampening action occurs when the piston 54 moves both toward and away from the inlet end 24 of the valve body 22.

Although the invention has been shown and described as having a valve seat assembly 32 as depicted in FIGS. 14A–D, it will be further appreciated that in some embodiments, modifications can be made to both the valve seat assembly 32 and/or air bleed aperture 34 without departing from the scope of the invention. For example, FIGS. 5A and B depict an unloader check valve 20 according to the invention having a trip check valve 98 in the air bleed aperture 34. In this embodiment, the air bleed aperture 34a extends from the hole 30 to the environment of the valve body 22, the air bleed aperture 34a having a bleed chamber 100 in which a bleeder rod assembly 102 and sealing surface 104 of the trip check valve 98 are contained. The bleeder rod assembly 102 includes a bleeder disk 106 and bleeder rod 108, the bleeder rod 108 being connected to the bleeder disk 106 and extending from the bleeder disk 106 into the hole 30 of the valve body 22. As best understood by comparing FIG. 5A with FIG. 5B, there is generally sufficient space within the bleed chamber 100 to permit the bleeder rod assembly 102 to pivot about the bleeder disk 106.

Figure 5A:
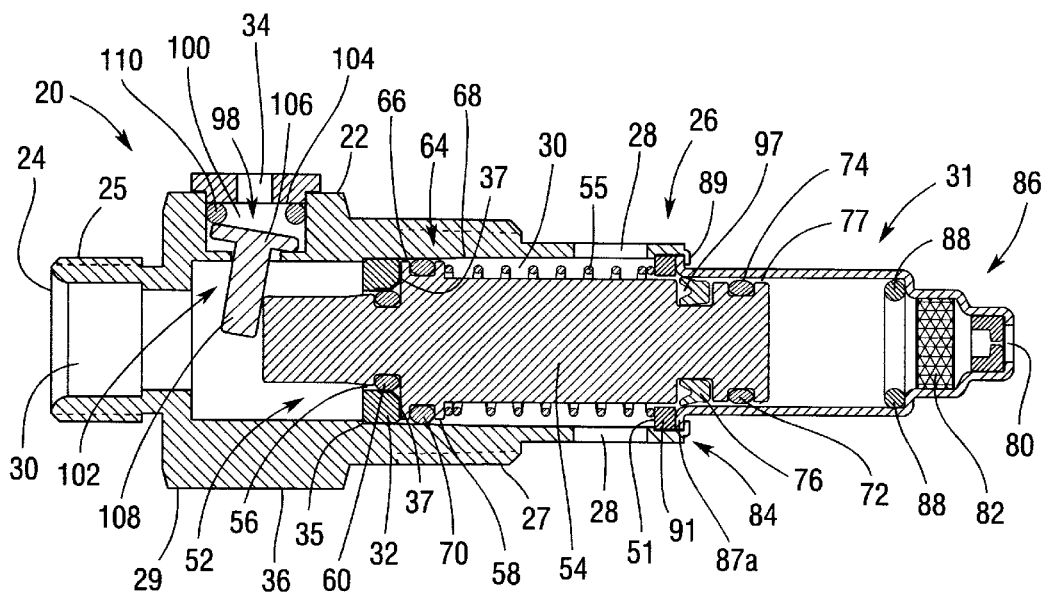
FIG. 5A is a cross sectional view of an unloader check valve according to another embodiment of the invention having a piston at a first piston location.

Referring first to FIG. 5A, in operation, the piston assembly 52 is configured to contact the bleeder rod 108 when the piston 52 is in the first piston location, as shown. This forces the bleeder rod assembly 102 to pivot to an orientation in which the bleeder disk 106 partially pulls away from the sealing surface 104 of the bleed chamber 100 to provide an opening through the air bleed aperture 34. This also permits air pressure to exit from the inlet end 24 of the valve body 22 as the piston assembly 52 seals the pressure vessel from the inlet end of the valve body 22.

Figure 5B:
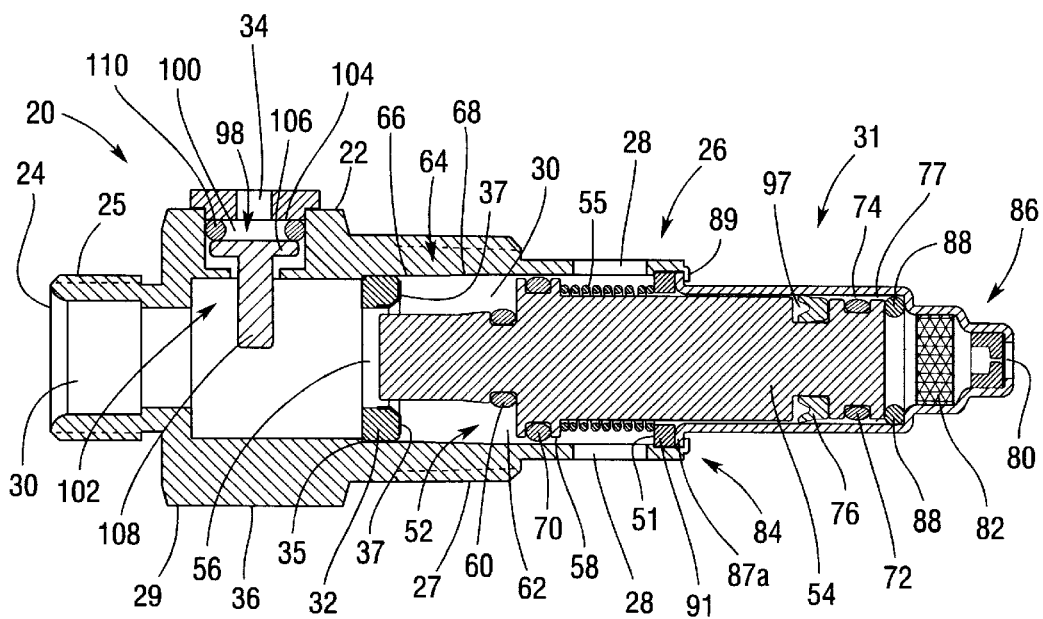
FIG. 5B is a cross sectional view of the unloader check valve of FIG. 5A, the piston being at a downstream piston location.

Referring now to FIG. 5B, the piston assembly 52 is depicted after the air compressor has been turned on to add air pressure to the inlet end 24 of the valve body 22. The increased air pressure forces the piston 54 to move to a downstream position so that the piston 54 no longer makes contact with the bleeder rod 108. As air passes through the piston hole 56 of the valve seat assembly 32 and past the check valve seal 60 toward the outlet end 26 of the valve body 22, the increased air pressure also pushes against the bleeder disk 106 inside the bleed chamber 100. Since the piston assembly 52 no longer restricts the movement of the bleeder rod 108, the bleeder disk 106 is free to pivot under the force of the increased air pressure to enable the bleeder disk 106 to seal against the sealing surface 104 of the bleed chamber 100. As shown in this embodiment, the sealing surface 104 can include a gasket 110 to improve this sealing effect.

In an additional embodiment, depicted in FIGS. 6A and B, the hole 30 extending through the valve body 22 follows a non-linear axis with the air bleed aperture 34b having a stem check valve 112 in a bleed chamber 100. In the bleed chamber 100a the stem check valve 112 has a stem spring seat 114 and a stem seat 116. A stem assembly 118 includes a stem head 120, stem seal 122, stem rod 124, and stem spring 126. The stem head 120, stem seal 122 and stem spring 126 are positioned within the bleed chamber 100, while the stem rod 124 extends from the stem head 120 into the hole 30 of the valve body 22. The stem spring 126 is positioned between the stem head 120 and stem spring seat 114 to bias the stem seal 122 to seal against the stem seat 116.

Referring to FIG. 6A, when the compressor is turned off and no additional air pressure is being added to the inlet end 24 of the valve body 22, the piston assembly 52 contacts the stem rod 124, pushing the stem assembly 118 in a direction that is away from the outlet end 26 of the valve body 22. This compresses the stem spring 126 between the stem head 120 and stem spring seat 114 and removes the stem seal 122 from the stem seat 116, allowing air pressure from the inlet end 24 of the valve body 22 to enter the bleed chamber 100 and exit through the air bleed aperture 34.

Figure 6B:
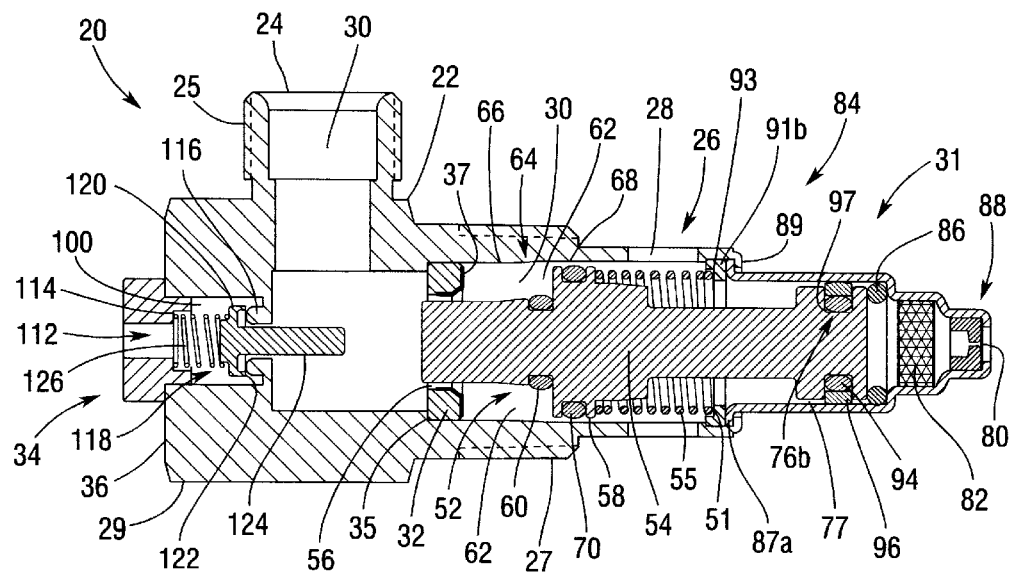
FIG. 6B is a cross sectional view of the unloader check valve of FIG. 6A, the piston being at a downstream piston location.

In FIG. 6B, the piston assembly 52 is depicted with the piston 54 in a downstream position after the compressor begins to add air pressure through the inlet end 24 of the valve body 22. Once the piston 54 moves to the depicted downstream piston location, the piston assembly 52 no longer restricts movement of the stem rod 124. However, the spring force of the stem spring 126 is greater in proportion to the compressible surface area of the stem rod 124 than is the spring force of the piston spring 55 in proportion to the compressible surface area of the piston assembly 52. Thus, even when the piston 52 is at the downstream piston location that is furthest away from the stem check valve 112 (as depicted in FIG. 6B) the force of the air pressure from the compressor is normally not sufficient to overcome the force of the stem spring 126. This permits the stem spring 126 to force the stem seal 122 against the stem seat 116 and close the stem check valve 112.

Although the invention has been shown and described as having a piston assembly 52 that includes a piston 54 comprising a single component that extends into the dampener 31, it will be further appreciated that the piston assembly 52 can be constructed so that other components extend into the dampener 31 or into other areas of the unloader check valve 20. For example, referring to FIG. 9, the depicted piston assembly 52 includes an extension 128 connected to the piston 54 so that the extension 128 remains inside the dampener 31 during the operation of the check valve 20. The extension 128 can be fastened to the piston 54 with a wedged, riveted, welded or other appropriately connected fitting.

Those skilled in the art will recognize that the various features of this invention described above can be used in various combinations with other elements without departing from the scope of the invention. Thus, the appended claims are intended to be interpreted to cover such equivalent unloader check valves which do not depart from the spirit and scope of the invention.

What is claimed is:

1. An unloader check valve to be installed between a compressor and an air receiver comprising:

an elongated valve body having an inlet end and an outlet end and a hole extending therethrough from said inlet end to said outlet end;

an air bleed aperture extending through said valve body from a location in said hole;

an unloader valve seal reciprocally mounted to move along a path within said hole;

a valve seat assembly installed within said hole between said unloader valve seal and said outlet end of said valve body, said valve seat assembly having a circumference and a groove around said circumference, said groove of said valve seat assembly being adjacent said air bleed aperture when said valve seat assembly is installed in said valve body;

said valve seat assembly having a plurality of raised unloader seating elements extending toward said inlet end of said valve body and in the path of said unloader valve seal, said unloader seating elements having at least a passage leading from said groove toward said inlet end of said valve body;

said valve seat assembly having a check valve seat;

a piston assembly mounted within said hole of said valve body, said piston assembly including a piston, a piston spring and a check valve seal, said piston spring normally biasing said piston toward said inlet end of said valve body to a first piston location when the compressor is turned off;

said piston assembly having a size and being located at a position within the hole which enables it to force said unloader valve seal away from said seating elements when said piston is at the first piston location, said check valve seal being positioned so as to contact said check valve seat when said piston is at the first piston location;

said unloader check valve permitting air to flow from between said unloader valve seal and said valve seat assembly through said at least a passage of said unloader seating elements to said groove of said valve seat assembly and permitting air to exit said unloader check valve through said air bleed aperture when said piston assembly holds said unloader valve seal away from said unloader seating elements;

said piston being movable from the first piston location toward at least one downstream piston location further away from said inlet end of said valve body than the first piston location when the compressor is turned on to increase pressure within the air receiver;

said piston assembly permitting said unloader valve seal to move toward and contact said unloader seating elements when said piston moves toward one of the downstream piston locations, thereby preventing air from passing from said inlet end of said body to said air bleed aperture when said piston is in one of the downstream piston locations;

said piston being movable toward the first piston location by said piston spring when said air compressor forces decreasing amounts of air from the air compressor toward the air receiver a dampener connected to said valve body, said dampener being configured to dampen movement of said piston.

2. The unloader check valve of claim 1 in which said dampener comprises a dampener cylinder having a first end, a second end, and an inside diameter, said first end of said dampener cylinder being positioned at the outlet end of said valve body, said second end of said dampener cylinder having a dampener orifice therethrough, said piston assembly extending into said dampener cylinder when said piston is at the first piston location.

3. The unloader check valve of claim 1 in which said dampener further comprises:

a dampener cylinder having a first end, a second end, and an inside diameter, said first end of said dampener cylinder being positioned at the outlet end of said valve body, said second end of said dampener cylinder having a dampener orifice therethrough;

said piston assembly extending into said dampener cylinder when said piston is at the first piston location;

a unidirectional seal positioned to allow air to flow between said inside diameter of said dampener cylinder and said piston assembly when said piston moves toward said outlet end of said valve body; said unidirectional seal also being positioned to prevent air from flowing between said inside diameter of said dampener cylinder and said piston assembly when said piston moves away from said outlet end of said valve body.

4. The unloader check valve of claim 1 in which said dampener further comprises:

a dampener cylinder having a first end, a second end, and an inside diameter, said first end of said dampener cylinder being positioned at the outlet end of said valve body, said second end of said dampener cylinder having a dampener orifice therethrough;

said piston assembly extending into said dampener cylinder when said piston is at the first piston location;

an o-ring seal positioned to prevent air from flowing between said inside diameter of said dampener cylinder and said piston assembly when said piston moves toward said outlet end of said valve body; said o-ring seal also being positioned to prevent air from flowing between said inside diameter of said dampener cylinder and said piston assembly when said piston moves away from said outlet end of said valve body.

5. The unloader check valve of claim 1, said check valve seal comprising an o-ring mounted on said piston.

6. The unloader check valve of claim 1, said piston assembly including a ball positioned to reciprocate with said piston and to comprise said check valve seal, said ball contacting said check valve seat when said piston is in the first piston location.

7. The unloader check valve of claim 1, said piston assembly including a bumper mounted on said piston between said valve seat assembly and said output end of said valve body, said bumper having a size which allows a sufficient amount of clearance with said valve body to allow air pressure to flow from said check valve seal to said outlet end of said valve body when said piston is at a location that is downstream of the first piston location.

8. The unloader check valve of claim 1, said piston assembly including a first bumper comprising an o-ring mounted on said piston between said valve seat assembly and said output end of said valve body, said bumper having a size which allows a sufficient amount of clearance with said valve body to allow air pressure to flow from said check valve seal to said outlet end of said valve body.

9. The unloader check valve of claim 1, said piston assembly including a first bumper comprising a ball positioned to reciprocate with said piston, said bumper having a size which allows a sufficient amount of clearance with said valve body to allow air pressure to flow from said check valve seal to said outlet end of said valve body.

10. The unloader check valve of claim 1, said piston assembly including a ball positioned to reciprocate with said piston, said ball comprising said check valve seal and contacting said check valve seat when said piston is in the first piston location, said ball further comprising a first bumper having a size which allows a sufficient amount of clearance with said valve body to allow air pressure to flow from said check valve seal to said outlet end of said valve body.

11. The unloader check valve of claim 1, said plurality of raised unloader seating elements comprising three approximately equidistantly spaced seating elements.

12. The unloader check valve of claim 1, said plurality of raised unloader seating elements comprising three approximately equidistantly spaced seating elements, each said unloader seating element having one said passage leading from said groove toward said inlet end of said valve body.

13. The unloader check valve of claim 1, said unloader valve seal comprising a material that is sufficiently resilient to allow said unloader seating elements to impress and seal against said unloader valve seal when said unloader valve seal contacts said unloader seating elements.

14. The unloader check valve of claim 1, said valve seat assembly including a piston hole through which said piston assembly extends to contact said unloader valve seal when said piston is at the first piston location, said piston hole permitting air to flow from said inlet end of said valve body toward said outlet end of said valve body when said piston is at a downstream piston location.

15. The unloader check valve of claim 1, said unloader valve seal including a piston hole through which air can flow from said inlet end of said valve body toward said outlet end of said valve body when said piston allows said unloader valve seal to contact said unloader seating elements.

16. The unloader check valve of claim 1, said at least one downstream piston location comprising a plurality of downstream piston locations to which said piston can move when the compressor is turned on to increase pressure within the air receiver, said piston being movable a greater distance from the first position with an increase in the magnitude of air pressure from the compressor.

17. The unloader check valve of claim 1, said hole of said valve body having a tapered portion that includes at least a first inner diameter and at least a second inner diameter that is larger than said first inner diameter, said first inner diameter of said tapered portion being closer to said inlet end of said valve body than said second inner diameter of said tapered portion;

a first clearance space existing between said check valve seal and said tapered portion of said valve body when said piston moves to a first of the downstream piston locations, said first clearance space permitting a first level of air flow; a second clearance space existing between said check valve seal and said tapered position of said valve body when said piston moves to a second of the downstream piston locations, the second of the downstream piston locations being further away from said inlet end of said valve body than the first of the downstream piston locations, said second clearance space permitting a second level of air flow;

said second clearance space being greater than said first clearance space, the second level of air flow being greater than the first level of air flow.

18. The unloader check valve of claim 1, said hole having an upstream inside diameter that is upstream of said valve seat assembly, said unloader valve seal having an outside diameter, said upstream inside diameter of said hole being larger than said outside diameter of said unloader valve seal to allow for a pressure discharge gap, said pressure discharge gap allowing air to pass from said inlet end of said valve body past said unloader valve seal toward said passage of said unloader seating elements when said piston is at the first piston location.

19. An unloader check valve to be installed between a compressor and an air receiver comprising:

an elongated valve body having an inlet end and an outlet end and a hole extending therethrough from said inlet end to said outlet end, said hole including a tapered portion including at least a first inner diameter and at least a second inner diameter that is larger than said first inner diameter, said first inner diameter of said tapered portion being closer to said inlet end of said valve body than said second inner diameter of said tapered portion;

a piston assembly mounted within said hole of said valve body, said piston assembly including a piston, a piston spring and a check valve seal, said piston spring normally biasing said piston toward said inlet end of said valve body to a first piston location;

a check valve seat being positioned in said hole of said valve body between said inlet end and said tapered position of said hole, said check valve seal being positioned so as to contact said check valve seat when said piston is at the first piston location;

said piston being movable from the first piston location to a plurality of downstream piston locations within said tapered portion of said hole when the compressor forces air from the air compressor through said inlet end of said valve body toward the air receiver, each of the downstream piston locations being further away from said inlet end of said valve body than the first piston location;

said piston assembly removing said check valve seal from contact with said check valve seat when said piston moves toward one of the downstream piston locations, thereby permitting air to move from the compressor through said inlet end of said valve body toward said outlet end of said valve body;

a first clearance space existing between said check valve seal and said tapered portion of said valve body when said piston moves to a first of the downstream piston locations, said first clearance space permitting a first level of air flow;

a second clearance space existing between said check valve seal and said tapered portion of said valve body when said piston moves to a second of the downstream piston locations, the second of the downstream piston locations being further away from said inlet end of said valve body than the first of the downstream piston locations, said second clearance space permitting a second level of air flow;

said second clearance space being greater than said first clearance space, the second level of air flow being greater than the first level of air flow.

20. The unloader check valve of claim 19 further comprising a dampener having a first end, a second end, and an inside diameter, said first end of said dampener being positioned at the outlet end of said valve body, said second end of said dampener having a dampener orifice therethrough, said piston assembly extending into said dampener when said piston is at the first piston location.

21. The unloader check valve of claim 19, the downstream piston location of said piston being dependent on the volume output level of the air compressor wherein said piston moves to a first of the downstream piston locations when the air compressor has a first volume output level, said piston moving to a second of the downstream piston locations father from the inlet end of said valve body than the first of the downstream piston locations when the air compressor has a second volume output level greater than said first volume output level.

22. The unloader check valve of claim 19 including a trip check valve, said trip check valve comprising:

an air bleed aperture extending through said valve body from a location in said hole, said air bleed aperture including a bleed chamber, said bleed chamber having a sealing surface;

a bleeder rod assembly having a bleeder disk positioned within said bleed chamber and a bleeder rod attached to said bleeder disk, said bleeder rod positioned to extend from said bleeder disk into said hole of said valve body, said bleeder disk being configured to seal against said sealing surface of said bleed chamber when air pressure is introduced into said valve body and at least when said piston is in one of the downstream piston locations;

said piston assembly being configured to contact said bleeder rod and to remove said bleeder disk from sealing against said sealing surface of said bleed chamber at least when said piston is in the first piston location, said piston assembly thereby permitting air to flow from said inlet end of said valve body through said air bleed aperture of said trip check valve.

23. The unloader check valve of claim 19 including a stem check valve, said stem check valve comprising:

an air bleed aperture extending through said valve body from a location in said hole, said air bleed aperture including a bleed chamber, said bleed chamber having a stem spring seat and a stem seat;

a stem assembly having a stem head, a stem seal, a stem rod, and a stem spring, said stem head and stem seal being positioned within said bleed chamber, said stem rod extending from said stem head into said hole of said valve body, said stem spring positioned between said stem head and said stem spring seat, said stem spring biasing said stem seal to seal against said stem seat;

said stem assembly being configured to permit said stem seal to seal against said stem seat of said bleed chamber when air pressure is introduced into said valve body and at least when said piston is in one of the downstream piston locations;

said piston assembly being configured to contact said stem rod and to remove said stem seal from sealing against said stem seat of said bleed chamber at least when said piston is in the first piston location, said piston assembly thereby permitting air to flow from said inlet end of said valve body through said air bleed aperture of said stem check valve.

24. The unloader check valve of claim 19 further comprising a dampener having a dampener cylinder having a first end, a second end, and an inside diameter, said first end of said dampener cylinder being positioned at the outlet end of said valve body, said second end of said dampener cylinder having a dampener orifice therethrough, said piston assembly extending into said dampener cylinder when said piston is at the first piston location.

25. The unloader check valve of claim 19 further comprising a dampener having a dampener cylinder having a first end, a second end, and an inside diameter, said first end of said dampener cylinder being positioned at the outlet end of said valve body, said second end of said dampener cylinder having a dampener orifice therethrough, said piston assembly extending into said dampener cylinder when said piston is at the first piston location;

a unidirectional seal positioned to allow air to flow between said inside diameter of said dampener cylinder and said piston assembly when said piston moves toward said outlet end of said valve body; said unidirectional seal also being positioned to prevent air from flowing between said inside diameter of said dampener cylinder and said piston assembly when said piston moves away from said outlet end of said valve body.

26. The unloader check valve of claim 19 further comprising a dampener having a dampener cylinder having a first end, a second end, and an inside diameter, said first end of said dampener cylinder being positioned at the outlet end of said valve body, said second end of said dampener cylinder having a dampener orifice therethrough;

said piston assembly extending into said dampener cylinder when said piston is at the first piston location;

an o-ring seal positioned to prevent air from flowing between said inside diameter of said dampener cylinder and said piston assembly when said piston moves toward said outlet end of said valve body; said unidirectional seal also being positioned to prevent air from flowing between said inside diameter of said dampener cylinder and said piston assembly when said piston moves away from said outlet end of said valve body.

27. The unloader check valve of claim 19, said check valve seal comprising an o-ring mounted on said piston.

28. The unloader check valve of claim 19, said piston assembly including a ball positioned to reciprocate with said piston and to comprise said check valve seal, said ball contacting said check valve seat when said piston is in the first piston location.

29. The unloader check valve of claim 19, said piston assembly including a bumper mounted on said piston, said bumper permitting a sufficient amount of clearance with said valve body to allow air pressure to flow from said check valve seal to said outlet end of said valve body.

30. The unloader check valve of claim 19, said piston assembly including a bumper comprising an o-ring mounted on said piston, said bumper permitting a sufficient amount of clearance with said valve body to allow air pressure to flow from said check valve seal to said outlet end of said valve body.

31. The unloader check valve of claim 19, said piston assembly including a bumper comprising a ball positioned to reciprocate with said piston, said bumper permitting a sufficient amount of clearance with said valve body to allow air pressure to flow from said check valve seal to said outlet end of said valve body.

32. The unloader check valve of claim 19, said piston assembly including a ball positioned to reciprocate with said piston, said ball comprising said check valve seal and contacting said check valve seat when said piston is in the first piston location, said ball further comprising a bumper that permits a sufficient amount of clearance with said valve body to allow air pressure to flow from said check valve seal to said outlet end of said valve body.

33. The unloader check valve of claim 19, said piston being movable a greater distance from the first piston location with an increase in the magnitude of air pressure from the air compressor.

34. The unloader check valve of claim 19 further comprising:

an air bleed aperture extending through said valve body from a location in said hole;

an unloader valve seal reciprocally mounted to move along a path within said hole;

a valve seat assembly installed within said hole between said unloader valve seal and said outlet end of said valve body, said valve seat assembly having a circumference and a groove around said circumference, said groove of said valve seat assembly being adjacent said air bleed aperture when said valve seat assembly is installed in said valve body;

said valve seat assembly having a plurality of raised unloader seating elements extending toward said inlet end of said valve body and in the path of said unloader valve seal, said unloader seating elements having at least a passage leading from said groove toward said inlet end of said valve body;

said piston assembly having a size and being located at a position within the hole which enables it to force said unloader valve seal away from said seating elements when said piston is at the first piston location, said check valve seal being positioned so as to contact said check valve seat when said piston is at the first piston location;

said unloader check valve permitting air to flow from between said unloader valve seal and said valve seat assembly through said at least a passage of said unloader seating elements to said groove of said valve seat assembly and permitting air to exit said unloader check valve through said air bleed aperture when said piston assembly holds said unloader valve seal away from said unloader seating elements;

said piston assembly permitting said unloader valve seal to move toward and contact said unloader seating elements when said piston moves toward one of the downstream piston locations, thereby preventing air from passing from said inlet end of said body to said air bleed aperture when said piston is in one of the downstream piston locations.

35. The unloader check valve of claim 19, said hole having an upstream inside diameter that is upstream of said valve seat assembly, said unloader valve seal having an outside diameter, said upstream inside diameter of said hole being larger than said outside diameter of said unloader valve seal to allow for a pressure discharge gap, said pressure discharge gap allowing air to pass from said inlet end of said valve body past said unloader valve seal toward said passage of said unloader seating elements when said piston is at the first piston location.

36. The unloader check valve of claim 19, said plurality of raised unloader seating elements comprising three approximately equidistantly spaced seating elements.

37. The unloader check valve of claim 19, said plurality of raised unloader seating elements comprising three approximately equidistantly spaced seating elements, each said unloader seating element having one said passage leading from said groove toward said inlet end of said valve body.

38. The unloader check valve of claim 19, said unloader valve seal comprising a material that is sufficiently resilient to allow said unloader seating elements to impress and seal against said unloader valve seal when said unloader valve seal contacts said unloader seating elements.

39. The unloader check valve of claim 19, said valve seat assembly including a piston hole through which said piston assembly extends to contact said unloader valve seal when said piston is at the first piston location, said piston hole permitting air to flow from said inlet end of said valve body toward said outlet end of said valve body when said piston is at one of the downstream piston locations.

40. The unloader check valve of claim 19, said unloader valve seal including a piston hole through which air can flow from said inlet end of said valve body toward said outlet end of said valve body when said piston allows said unloader valve seal to contact said unloader seating elements.

41. The unloader check valve of claim 19, said piston being movable to one of the plurality of downstream piston locations that is a greater distance from the first position location with an increase in the magnitude of air pressure from the compressor.

42. An unloader check valve to be installed between a compressor and an air receiver comprising:
an elongated valve body having an inlet end and an outlet end and a hole extending therethrough from said inlet end to said outlet end, said hole having an inside diameter;
a piston assembly mounted within said hole of said valve body, said piston assembly including a check valve seal, a piston, a first bumper, a dampener seal, and a piston spring, said first bumper and said dampener seal comprising rings extending around said piston assembly, said piston spring normally biasing said piston toward said inlet end of said valve body to a first piston location;
a dampener cylinder having a first end, a second end, and an inside diameter, said first end of said dampener cylinder being positioned at the outlet end of said body, said second end of said dampener cylinder having a dampener orifice therethrough, is said piston assembly extending into said dampener cylinder when said piston is at the first piston location;
said first bumper being positioned so as to remain inside said hole of said valve body during operation of said unloader check valve, said dampener seal being positioned so as to remain inside said inside diameter of said dampener cylinder during operation of said unloader check valve.

43. The unloader check valve of claim 42 in which a seal clearance exists between said dampener seal and said inside diameter of said dampener cylinder when said piston moves away from said inlet end of said valve body, said dampener seal closing said seal clearance when said piston moves toward said inlet end of said valve body.

44. The unloader check valve of claim 42, said piston assembly further comprising a second bumper comprising a ring extending around said piston assembly, said second bumper being positioned so as to remain inside said dampener cylinder during operation of said unloader check valve, a second bumper clearance existing between said second bumper and said inside diameter of said dampener cylinder.

45. The unloader check valve of claim 42, said dampener seal comprising a ring that is a u-cup seal which is positioned so as to remain inside said inside diameter of said dampener cylinder, a seal clearance existing between said dampener seal of said piston assembly and said inside diameter of said dampener cylinder when said piston moves away from said inlet end of said valve body, said dampener seal closing said seal clearance when said piston moves toward said inlet end of said valve body.

46. The unloader check valve of claim 42, said piston assembly further comprising a second bumper comprising a ring extending around said piston assembly, said second bumper being positioned so as to remain inside said dampener cylinder during operation of said unloader check valve, a second bumper clearance existing between said second bumper and said inside diameter of said dampener cylinder;
a seal clearance existing between said dampener seal and said inside diameter of said dampener cylinder when said piston moves away from said inlet end of said valve body, said dampener seal closing said seal clearance when said piston moves toward said inlet end of said valve body.

47. The unloader check valve of claim 42, said piston assembly further comprising a second bumper comprising a ring extending around said piston assembly, said second bumper being positioned so as to remain inside said dampener cylinder during operation of said unloader check valve, a second bumper clearance existing between said second bumper and said inside diameter of said dampener cylinder;
said dampener seal comprising a ring that is a u-cup seal which is positioned so as to remain inside said inside diameter of said dampener cylinder, a seal clearance existing between said dampener seal of said piston assembly and said inside diameter of said dampener cylinder when said piston moves away from said inlet end of said valve body, said dampener seal closing said seal clearance when said piston moves toward said inlet end of said valve body.

48. The unloader check valve of claim 42, a cylinder clearance existing between the piston assembly and said inside diameter of said dampener cylinder, said dampener seal closing said cylinder clearance when said piston moves toward said inlet end of said valve body and when said piston moves toward said outlet end of said valve body.

49. The unloader check valve of claim 42, said piston assembly including a dampener groove around the circumference of said piston assembly, said dampener seal of said piston assembly including a compression ring, said compression ring being positioned around the circumference of said piston assembly within said dampener groove, said dampener seal further comprising a seal ring extending around the circumference of said piston assembly and outside of said compression ring on said dampener groove, said compression ring being configured to exert outward compression forces on said seal ring against said inside diameter of said dampener cylinder.

50. The unloader check valve of claim 42, said compression ring comprising an elastic material, said seal ring comprising a low-friction material.

51. The unloader check valve of claim 42, said seal ring comprising Teflon.

52. The unloader check valve of claim 42, said compression ring comprising an elastic polymer material.

53. The unloader check valve of claim 42, a dampener bumper being positioned near said second end of said dampener cylinder to restrict movement of said piston assembly and to cushion contact between said second end of said dampener cylinder and said piston assembly.

54. The unloader check valve of claim 42, said piston spring being positioned within said valve body with a spring seat, said spring seat comprising a washer ring positioned approximately adjacent said first end of said dampener cylinder.

55. The unloader check valve of claim 42, said piston spring being positioned within said valve body with a spring seat, said spring seat being machined into said first end of said dampener cylinder.

56. The unloader check valve of claim 42, said piston spring being positioned within said valve body with a spring seat, said spring seat comprising a ring collar positioned at about said first end of said dampener cylinder.

57. The unloader check valve of claim 42 including a trip check valve, said trip check valve comprising:

an air bleed aperture extending through said valve body from a location in said hole, said air bleed aperture including a bleed chamber, said bleed chamber having a sealing surface;

a bleeder rod assembly having a bleeder disk positioned within said bleed chamber and a bleeder rod attached to said bleeder disk, said bleeder rod positioned to extend from said bleeder disk into said hole of said valve body, said bleeder disk being configured to seal against said sealing surface of said bleed chamber when air pressure is introduced into said valve body and at least when said piston is in one of a plurality of downstream piston locations;

said piston assembly being configured to contact said bleeder rod and to remove said bleeder disk from sealing against said sealing surface of said bleed chamber at least when said piston is in the first piston location, said piston assembly thereby permitting air to flow from said inlet end of said valve body through said air bleed aperture of said trip check valve.

58. The unloader check valve of claim 42 including a stem check valve, said stem check valve comprising:

an air bleed aperture extending through said valve body from a location in said hole, said air bleed aperture including a bleed chamber, said bleed chamber having a stem spring seat and a stem seat;

a stem assembly having a stem head, a stem seal, a stem rod, and a stem spring, said stem head and stem seal being positioned within said bleed chamber, said stem rod extending from said stem head into said hole of said valve body, said stem spring positioned between said stem head and said stem spring seat, said stem spring biasing said stem seal to seal against said stem seat;

said stem assembly being configured to permit said stem seal to seal against said stem seat of said bleed chamber when air pressure is introduced into said valve body and at least when said piston is in one of a plurality of downstream piston locations;

said piston assembly being configured to contact said stem rod and to remove said stem seal from sealing against said stem seat of said bleed chamber at least when said piston is in the first piston location, said piston assembly thereby permitting air to flow from said inlet end of said valve body through said air bleed aperture of said stem check valve.

59. The unloader check valve of claim 42 further comprising:

an air bleed aperture extending through said valve body from a location in said hole;

an unloader valve seal reciprocally mounted to move along a path within said hole;

a valve seat assembly installed within said hole between said unloader valve seal and said outlet end of said valve body, said valve seat assembly having a circumference and a groove around said circumference, said groove of said valve seat assembly being adjacent said air bleed aperture when said valve seat assembly is installed in said valve body;

said valve seat assembly having a plurality of raised unloader seating elements extending toward said inlet end of said valve body and in the path of said unloader valve seal, said unloader seating elements having at least a passage leading from said groove toward said inlet end of said valve body;

said valve seat assembly having a check valve seat;

said piston assembly having a size and being located at a position within the hole which enables it to force said unloader valve seal away from said seating elements when said piston is at the first piston location, said check valve seal being positioned so as to contact said check valve seat when said piston is at the first piston location;

said unloader check valve permitting air to flow from between said unloader valve seal and said valve seat assembly through said at least a passage of said unloader seating elements to said groove of said valve seat assembly and permitting air to exit said unloader check valve through said air bleed aperture when said piston assembly holds said unloader valve seal away from said unloader seating elements;

said piston assembly permitting said unloader valve seal to move toward and contact said unloader seating elements when said piston moves toward a piston location that is downstream piston location, thereby preventing air from passing from said inlet end of said body to said air bleed aperture when said piston is at a piston location that is downstream from the first piston location;

said piston being movable toward the first piston location by said piston spring when said air compressor forces decreasing amounts of air from the air compressor toward the air receiver;

a dampener connected to said valve body, said dampener being configured to dampen movement of said piston.

60. The unloader check valve of claim 42, said hole having an upstream inside diameter that is upstream of said valve seat assembly, said unloader valve seal having an outside diameter, said upstream inside diameter of said hole being larger than said outside diameter of said unloader valve seal to allow for a pressure discharge gap, said pressure discharge gap allowing air to pass from said inlet end of said valve body past said unloader valve seal toward said passage of said unloader seating elements when said piston is at the first piston location.

61. The unloader check valve of claim 42, said plurality of raised unloader seating elements comprising three approximately equidistantly spaced seating elements.

62. The unloader check valve of claim 42, said plurality of raised unloader seating elements comprising three approximately equidistantly spaced seating elements, each said unloader seating element having one said passage leading from said groove toward said inlet end of said valve body.

63. The unloader check valve of claim 42, said unloader valve seal comprising a material that is sufficiently resilient to allow said unloader seating elements to impress and seal against said unloader valve seal when said unloader valve seal contacts said unloader seating elements.

64. The unloader check valve of claim 42, said valve seat assembly including a piston hole through which said piston assembly extends to contact said unloader valve seal when said piston is at the first piston location, said piston hole permitting air to flow from said inlet end of said valve body toward said outlet end of said valve body when said piston is at a downstream piston location.

65. The unloader check valve of claim 42, said unloader valve seal including a pressure hole through which air can flow from said inlet end of said valve body toward said outlet end of said valve body when said piston allows said unloader valve seal to contact said unloader seating elements.

66. An unloader check valve to be installed between a compressor and an air receiver comprising:
   an elongated valve body having an inlet end and an outlet end and a hole extending therethrough from said inlet end to said outlet end;
   an air bleed aperture extending through said valve body from a location in said hole;
   an unloader valve seal reciprocally mounted within said hole;
   a valve seat assembly installed within said hole between said unloader valve seal and said outlet end of said valve body, said valve seat assembly having a circumference and a groove around said circumference, said groove of said valve seat assembly being adjacent said air bleed aperture when said valve seat assembly is installed in said valve body;
   said valve seat assembly having a plurality of raised unloader seating elements extending toward said inlet end of said valve body and in the path of said unloader valve seal, said unloader seating elements having at least a passage leading from said groove toward said inlet end of said valve body;
   said valve seat assembly having a check valve seat;
   a piston assembly mounted within said hole of said valve body, said piston assembly including a piston, a piston spring and a check valve seal, said piston spring normally biasing said piston toward said inlet end of said valve body to a first piston location when the compressor is turned off;
   said hole extending through said valve body and having a plurality of inside diameters, each of said inside diameters being at one of a plurality of downstream piston locations that are downstream of said valve seat assembly, said inside diameters being smaller at the downstream piston locations that are immediately downstream of said valve seat assembly than at the piston locations that are further downstream from said valve seat assembly;
   said piston assembly having a size and being located at a position within the hole which enables it to force said unloader valve seal away from said seating elements when said piston is at the first piston location, said check valve seal being positioned to seal against one of said inside diameters of said hole of said valve body when said piston is at the first piston location, said check valve seal being further positioned so as to not seal against one of said inside diameters of said hole of said valve body when said piston is at at least one of the downstream piston locations;
   said unloader check valve permitting air to flow from between said unloader valve seal and said valve seat assembly through said at least a passage of said unloader seating elements to said groove of said valve seat assembly and permitting air to exit said unloader check valve through said air bleed aperture when said piston assembly holds said unloader valve seal away from said unloader seating elements;
   said piston being movable from the first piston location toward one of the downstream piston locations that is further away from said inlet end of said valve body than said first piston location when the compressor is turned on to increase pressure within the air receiver;
   said piston being movable toward the first piston location by said piston spring when said air compressor forces decreasing amounts of air from the air compressor toward the air receiver;
   said piston assembly permitting said unloader valve seal to move toward and contact said unloader seating elements when said piston moves to one of the downstream piston locations, thereby preventing air from passing from said inlet end of said body to said air bleed aperture when said piston is in one of the downstream piston locations;
   said piston being movable toward the first piston location by said biasing spring when said air compressor forces decreasing amounts of air from the air compressor toward the air receiver;
   a dampener connected to said valve body, said dampener being configured to dampen movement of said piston.

67. The unloader check valve of claim 66 further comprising a dampener cylinder having a first end, a second end, and an inside diameter, said first end of said dampener cylinder being fastened to the outlet end of said valve body, said second end of said dampener cylinder having a dampener orifice therethrough, said piston assembly extending into said dampener cylinder when said piston is at the first piston location.

68. The unloader check valve of claim 66 in which said dampener further comprising: a dampener cylinder having a first end, a second end, and an inside diameter, said first end of said dampener cylinder being positioned at the outlet end of said valve body, said second end of said dampener cylinder having a dampener orifice therethrough;
   said piston assembly extending into said dampener cylinder when said piston is at the first piston location;
   a unidirectional seal positioned to allow air to flow between said inside diameter of said dampener cylinder and said piston assembly when said piston moves toward said outlet end of said valve body; said unidirectional seal also being positioned to prevent air from flowing between said inside diameter of said dampener cylinder and said piston assembly when said piston moves away from said outlet end of said valve body.

69. The unloader check valve of claim 66 in which said dampener further comprises:
   a dampener cylinder having a first end, a second end, and an inside diameter, said first end of said dampener cylinder being positioned at the outlet end of said valve body, said second end of said dampener cylinder having a dampener orifice therethrough;
   said piston assembly extending into said dampener cylinder when said piston is at the first piston location;
   an o-ring seal positioned to prevent air from flowing between said inside diameter of said dampener cylinder and said piston assembly when said piston moves toward said outlet end of said valve body; said unidirectional seal also being positioned to prevent air from flowing between said inside diameter of said dampener cylinder and said piston assembly when said piston moves away from said outlet end of said valve body.

70. The unloader check valve of claim 66, said check valve seal comprising an o-ring mounted on said piston.

71. The unloader check valve of claim 66, said piston assembly including a ball positioned to reciprocate with said piston and to comprise said check valve seal, said ball contacting said check valve seat when said piston is at the first piston location.

72. The unloader check valve of claim 66, said piston assembly including a bumper comprising said check valve seal, said bumper permitting a sufficient amount of clearance with said valve body to allow air pressure to flow from said check valve seal to said outlet end of said valve body when said piston is at a piston location that is downstream of the first piston location.

73. The unloader check valve of claim 66, said piston assembly including a bumper comprising an o-ring mounted on said piston, said bumper permitting a sufficient amount of clearance with said valve body to allow air pressure to flow from said check valve seal to said outlet end of said valve body when said piston is at a piston location that is downstream of the first piston location.

74. The unloader check valve of claim 66, said piston assembly including a bumper comprising a ball positioned to reciprocate with said piston, said bumper permitting a sufficient amount of clearance with said valve body to allow air pressure to flow from said check valve seal to said outlet end of said valve body when said piston is at a piston location that is downstream of the first piston location.

75. The unloader check valve of claim 66, said piston assembly including a ball positioned to reciprocate with said piston, said ball comprising said check valve seal and contacting one of said inside diameters of said hole of said valve body when said piston is at the first piston location, said ball further comprising a bumper that permits a sufficient amount of clearance with said valve body to allow air pressure to flow from said check valve seal to said outlet end of said valve body when said piston is at a piston location that is downstream of the first piston location.

76. The unloader check valve of claim 66, said plurality of raised unloader seating elements comprising three approximately equidistantly spaced seating elements.

77. The unloader check valve of claim 66, said plurality of raised unloader seating elements comprising three approximately equidistantly spaced seating elements, each said unloader seating element having one said passage leading from said groove toward said inlet end of said valve body.

78. The unloader check valve of claim 66, said unloader valve seal comprising a material that is sufficiently resilient to allow said unloader seating elements to impress and seal against said unloader valve seal when said unloader valve seal contacts said unloader seating elements.

79. The unloader check valve of claim 66, said valve seat assembly including a piston hole through which said piston assembly extends to contact said unloader valve seal when said piston is at the first piston location, said piston hole permitting air to flow from said inlet end of said valve body toward said outlet end of said valve body when said piston is at a piston location that is downstream from the first piston location.

80. The unloader check valve of claim 66, said unloader valve seal including a pressure hole through which air can flow from said inlet end of said valve body toward said outlet end of said valve body when said piston allows said unloader valve seal to contact said unloader seating elements.

81. The unloader check valve of claim 66, said check valve seal comprising a first bumper positioned to reduce wear between said piston assembly and said valve body.

82. The unloader check valve of claim 66, said piston being movable a greater distance from the first piston location with an increase in the magnitude of air pressure from the air compressor.

83. The unloader check valve of claim 66, said hole of said valve body having a tapered portion that includes at least a first inner diameter and at least a second inner diameter that is larger than said first inner diameter, said first inner diameter of said tapered portion being closer to said inlet end of said valve body than said second inner diameter of said tapered portion;

a first clearance space existing between said check valve seal and said tapered portion of said valve body when said piston moves to a first of the downstream piston locations, said first clearance space permitting a first level of air flow;

a second clearance space existing between said check valve seal and said tapered position of said valve body when said piston moves to a second of the downstream piston locations, the second of the downstream piston locations being further away from said inlet end of said valve body than the first of the downstream piston locations, said second clearance space permitting a second level of air flow;

said second clearance space being greater than said first clearance space, the second level of air flow being greater than the first level of air flow.

84. The unloader check valve of claim 66, said hole having an upstream inside diameter that is upstream of said valve seat assembly, said unloader valve seal having an outside diameter, said upstream inside diameter of said hole being larger than said outside diameter of said unloader valve seal to allow for a pressure discharge gap, said pressure discharge gap allowing air to pass from said inlet end of said valve body past said unloader valve seal toward said passage of said unloader seating elements when said piston is at the first piston location.

85. An unloader check valve to be installed between a compressor and an air receiver comprising:

an elongated valve body having an inlet end and an outlet end and a hole extending therethrough from said inlet end to said outlet end;

an air bleed aperture extending through said valve body from a location in said hole;

an unloader valve seal reciprocally mounted within said hole;

a valve seat assembly installed within said hole between said unloader valve seal and said outlet end of said valve body, said valve seat assembly having a circumference and a groove around said circumference, said groove of said valve seat assembly being adjacent said air bleed aperture when said valve seat assembly is installed in said valve body;

said valve seat assembly having a plurality of raised unloader seating elements extending toward said inlet end of said valve body and in the path of said unloader valve seal, said unloader seating elements having at least a passage leading from said groove toward said inlet end of said valve body;

said valve seat assembly having a check valve seat;

a piston assembly mounted within said hole of said valve body, said piston assembly including a piston, a piston spring and a check valve seal, said piston spring normally biasing said piston toward said inlet end of said valve body to a first piston location when the compressor is turned off;

said piston assembly having a size and being located at a position within the hole which enables it to force said unloader valve seal away from said seating elements when said piston is at the first piston location, said check valve seal being positioned so as to contact said valve body when said piston is at the first piston location;

said unloader check valve permitting air to flow from between said unloader valve seal and said valve seat assembly through said at least a passage of said unloader seating elements to said groove of said valve seat assembly and permitting air to exit said unloader check valve through said air bleed aperture when said piston assembly holds said unloader valve seal away from said unloader seating elements;

said piston being movable from the first piston location toward a plurality of downstream piston locations further away from said inlet end of said valve body than the first piston location when the compressor is turned on to increase pressure within the air receiver;

said piston assembly permitting said unloader valve seal to move toward and contact said unloader seating elements when said piston moves toward one of the downstream piston locations, thereby preventing air from passing from said inlet end of said body to said air bleed aperture when said piston is in one of the downstream piston locations;

said piston being movable toward the first piston location by said biasing spring when said air compressor forces decreasing amounts of air from the air compressor toward the air receiver;

a dampener connected to said piston, said dampener being configured to dampen movement of said piston.

86. The unloader check valve of claim 85 in which said dampener cylinder comprises a first end, a second end, and an inside diameter, said first end of said dampener cylinder being positioned at the outlet end of said valve body, said second end of said dampener cylinder having a dampener orifice therethrough, said piston assembly extending into said dampener cylinder when said piston is at the first piston location.

87. The unloader check valve of claim 85 in which said dampener further comprising:

a dampener cylinder having a first end, a second end, and an inside diameter, said first end of said dampener cylinder being positioned at the outlet end of said valve body, said second end of said dampener cylinder having a dampener orifice therethrough; said piston assembly extending into said dampener cylinder when said piston is at the first piston location;

a unidirectional seal positioned to allow air to flow between said inside diameter of said dampener cylinder and said piston assembly when said piston moves toward said outlet end of said valve body, said unidirectional seal also being positioned to prevent air from flowing between said inside diameter of said dampener cylinder and said piston assembly when said piston moves away from said outlet end of said valve body.

88. The unloader check valve of claim 85 in which said dampener further comprising:

a dampener cylinder having a first end, a second end, and an inside diameter, said first end of said dampener cylinder being positioned at the outlet end of said valve body, said second end of said dampener cylinder having a dampener orifice therethrough;

said piston assembly extending into said dampener cylinder when said piston is at the first piston location;

an o-ring seal positioned to prevent air from flowing between said inside diameter of said dampener cylinder and said piston assembly when said piston moves toward said outlet end of said valve body, said seal also being positioned to prevent air from flowing between said inside diameter of said dampener cylinder and said piston assembly when said piston moves away from said outlet end of said valve body.

89. The unloader check valve of claim 85, said check valve seal comprising an o-ring mounted on said piston.

90. The unloader check valve of claim 85, said piston assembly including a ball positioned to reciprocate with said piston and to comprise said check valve seal, said ball contacting said check valve seat when said piston is at the first piston location.

91. The unloader check valve of claim 85, said piston assembly including a bumper comprising said check valve seal, said bumper permitting a sufficient amount of clearance with said valve body to allow air pressure to flow from said check valve seal to said outlet end of said valve body when said piston is at a piston location that is downstream of the first piston location.

92. The unloader check valve of claim 85, said piston assembly including a bumper comprising an o-ring mounted on said piston, said bumper permitting a sufficient amount of clearance with said valve body to allow air pressure to flow from said check valve seal to said outlet end of said valve body when said piston is at a piston location that is downstream of the first piston location.

93. The unloader check valve of claim 85, said piston assembly including a bumper comprising a ball positioned to reciprocate with said piston, said bumper permitting a sufficient amount of clearance with said valve body to allow air pressure to flow from said check valve seal to said outlet end of said valve body when said piston is at a piston location that is downstream of the first piston location.

94. The unloader check valve of claim 85, said piston assembly including a ball positioned to reciprocate with said piston, said ball comprising said check valve seal and contacting one of said inside diameters of said hole of said valve body when said piston is at the first piston location, said ball further comprising a bumper that permits a sufficient amount of clearance with said valve body to allow air pressure to flow from said check valve seal to said outlet end of said valve body when said piston is at a piston location that is downstream of the first piston location.

95. The unloader check valve of claim 85, said plurality of raised unloader seating elements comprising three approximately equidistantly spaced seating elements.

96. The unloader check valve of claim 85, said plurality of raised unloader seating elements comprising three approximately equidistantly spaced seating elements, each said unloader seating element having one said passage leading from said groove toward said inlet end of said valve body.

97. The unloader check valve of claim 85, said unloader valve seal comprising a material that is sufficiently resilient to allow said unloader seating elements to impress and seal against said unloader valve seal when said unloader valve seal contacts said unloader seating elements.

98. The unloader check valve of claim 85, said valve seat assembly including a piston hole through which said piston assembly extends to contact said unloader valve seal when said piston is at the first piston location, said piston hole permitting air to flow from said inlet end of said valve body toward said outlet end of said valve body when said piston is at one of the downstream piston locations.

99. The unloader check valve of claim 85, said unloader valve seal including a pressure hole through which air can flow from said inlet end of said valve body toward said outlet end of said valve body when said piston allows said unloader valve seal to contact said unloader seating elements.

100. The unloader check valve of claim 85, said check valve seal comprising a first bumper positioned to reduce wear between said piston assembly and said valve body.

101. The unloader check valve of claim 85, said piston being movable a greater distance from the first piston location with an increase in the magnitude of air pressure from the air compressor.

102. The unloader check valve of claim 85, said hole of said valve body having a tapered portion that includes at least a first inner diameter and at least a second inner diameter that is larger than said first inner diameter, said first inner diameter of said tapered portion being closer to said inlet end of said valve body than said second inner diameter of said tapered portion;

a first clearance space existing between said check valve seal and said tapered portion of said valve body when said piston moves to a first of the downstream piston locations, said first clearance space permitting a first level of air flow;

a second clearance space existing between said check valve seal and said tapered position of said valve body when said piston moves to a second of the downstream piston locations, the second of the downstream piston locations being further away from said inlet end of said valve body than the first of the downstream piston locations, said second clearance space permitting a second level of air flow;

said second clearance space being greater than said first clearance space, the second level of air flow being greater than the first level of air flow.

103. The unloader check valve of claim 85, said hole having an upstream inside diameter that is upstream of said valve seat assembly, said unloader valve seal having an outside diameter, said upstream inside diameter of said hole being larger than said outside diameter of said unloader valve seal to allow for a pressure discharge gap, said pressure discharge gap allowing air to pass from said inlet end of said valve body past said unloader valve seal toward said passage of said unloader seating elements when said piston is at the first piston location.

104. An unloader check valve to be installed between a compressor and an air receiver comprising:

an elongated valve body having an inlet end and an outlet end and a hole extending therethrough from said inlet end to said outlet end, an air bleed aperture extending through said valve body from a location in said hole;

an unloader valve seal reciprocally mounted to move along a path within said hole;

a valve seat assembly installed within said hole between said unloader valve seal and said outlet end of said valve body, said valve seat assembly having a circumference and a groove around said circumference, said groove of said valve seat assembly being adjacent said air bleed aperture when said valve seat assembly is installed in said valve body;

said valve seat assembly having a plurality of raised unloader seating elements extending toward said inlet end of said valve body and in the path of said unloader valve seal, said unloader seating elements having at least a passage leading from said groove toward said inlet end of said valve body;

said valve seat assembly having a check valve seat;

a piston assembly mounted within said hole of said valve body, said piston assembly including a piston, a piston spring and a check valve seal, said piston spring normally biasing said piston toward said inlet end of said valve body to a first piston location when the compressor is turned off;

said piston assembly having a size and being located at a position within the hole which enables it to force said unloader valve seal away from said seating elements when said piston is at the first piston location, said check valve seal being positioned so as to contact said check valve seat when said piston is at the first piston location;

said unloader check valve permitting air to flow from between said unloader valve seal and valve seat through said at least a passage of said unloader seating elements to said groove of said valve seat assembly and permitting air to exit said unloader check valve through said air bleed aperture when said piston assembly holds said unloader valve seal away from said unloader seating elements;

said piston being movable from the first piston location toward a plurality of downstream piston locations that are further away from said inlet end of said valve body than the first piston location when the compressor is turned on to increase pressure within the air receiver;

said piston assembly permitting said unloader valve seal to move toward and contact said unloader seating elements when said piston moves toward one of the downstream piston locations, thereby preventing air from passing from said inlet end of said body to said air bleed aperture when said piston is in one of the downstream piston locations;

said piston being movable toward the first piston location by said piston spring when said air compressor forces decreasing amounts of air from the air compressor toward the air receiver;

said hole of said valve body including a tapered portion including a first inner diameter and a second inner diameter that is larger than said first inner diameter, said first inner diameter of said tapered portion being closer to said inlet end of said valve body than said second inner diameter of said tapered portion;

said check valve seat being positioned to contact said check valve seat when said piston is at the first piston location;

said piston assembly removing said check valve seal from contact with said check valve seat when said piston moves toward one of the downstream piston locations, thereby permitting air to move from the compressor through said inlet end of said valve body past said check valve seal and toward said outlet end of said valve body;

a first clearance space existing between said check valve seal and said tapered portion of said valve body when said piston moves to a first of the downstream piston locations, said first clearance space permitting a first level of air flow;

a second clearance space existing between said check valve seal and said tapered portion of said valve body when said piston moves to a second of the downstream piston locations, the second of the downstream piston locations being further away from said inlet end of said valve body than the first of the downstream piston locations, said second clearance space permitting a second level of air flow;

said second clearance space being greater than said first clearance space, the second level of air flow being greater than the first level of air flow;

a dampener connected to said piston, said dampener being configured to dampen movement of said piston, said dampener including a dampener cylinder having a first end, a second end, and an inside diameter, said first end of said dampener cylinder being positioned at the outlet end of said valve body, said second end of said dampener cylinder having a dampener orifice therethrough, said piston assembly extending into said dampener cylinder when said piston is at the first piston location.

105. An unloader check valve to be installed between a compressor and an air receiver comprising:

a valve body having an inlet end and an outlet end and a hole extending therethrough from said inlet end to said outlet end;

an air bleed aperture extending through said valve body from a location in said hole;

an unloader valve seal reciprocally mounted to move along a path within said hole;

a valve seat assembly installed within said hole between said unloader valve seal and said outlet end of said valve body, said valve seat assembly having a circumference and a groove around said circumference, said groove of said valve seat assembly being adjacent said air bleed aperture when said valve seat assembly is installed in said valve body;

said valve seat assembly having a plurality of raised unloader seating elements extending toward said inlet end of said valve body and in the path of said unloader valve seal, said unloader seating elements having at least a passage leading from said groove toward said inlet end of said valve body;

a piston assembly mounted within said hole of said valve body, said piston assembly having a piston restricting movement of said unloader valve seal;

located at a position which enables said piston assembly to hold said unloader valve seal away from said seating elements when said piston is at a first piston location;

said unloader check valve permitting air to flow from between said unloader valve seal and said valve seat assembly through said at least a passage of said unloader seating elements to said groove of said valve seat assembly and permitting air to exit said unloader check valve through said air bleed aperture when said piston assembly holds said unloader valve seal away from said unloader seating elements;

said piston being movable from said first piston location toward at least one downstream piston location, said piston assembly permitting said unloader valve seal to move toward and contact said unloader seating elements when said piston moves toward one of the at least one downstream piston locations, thereby preventing air from passing from said inlet end of said body to said air bleed aperture when said piston is in one of the at least one downstream piston locations.

106. The unloader check valve of claim 105, said plurality of raised unloader seating elements comprising three approximately equidistantly spaced seating elements.

107. The unloader check valve of claim 105, said plurality of raised unloader seating elements comprising three approximately equidistantly spaced seating elements, each said unloader seating element having one said passage leading from said groove toward said inlet end of said valve body.

108. The unloader check valve of claim 105, said unloader valve seal comprising a material that is sufficiently resilient to allow said unloader seating elements to impress and seal against said unloader valve seal when said unloader valve seal contacts said unloader seating elements.

109. The unloader check valve of claim 105, said valve seat assembly including a piston hole through which said piston assembly extends to contact said unloader valve seal when said piston is at the first piston location, said piston hole permitting air to flow from said inlet end of said valve body toward said outlet end of said valve body when said piston is at a downstream piston location.

110. The unloader check valve of claim 105, said unloader valve seal including a pressure hole through which air can flow from said inlet end of said valve body toward said outlet end of said valve body when said piston assembly allows said unloader valve seal to contact said unloader seating elements.

111. A valve seat assembly for installation in a hole extending through an unloader check valve, said unloader check valve having an inlet end and an outlet end, an air bleed aperture, and an unloader valve seal, said valve seat assembly being positionable in said hole adjacent said air bleed aperture, said unloader valve seal being reciprocally mounted within said hole to move along a path between said inlet end and said valve seat assembly, said valve seat assembling comprising:

a circumference and a groove around said circumference, said groove of said valve seat assembly being adjacent said air bleed aperture when said valve seat assembly is installed in said valve body;

a plurality of raised unloader seating elements extending toward said inlet end of said valve body and in the path of said unloader valve seal, said unloader seating elements having at least a passage leading from said groove toward said inlet end of said valve body.

112. The valve seat assembly of claim 111, said plurality of raised unloader seating elements comprising three approximately equidistantly spaced seating elements.

113. The valve seat assembly of claim 111, said plurality of raised unloader seating elements comprising three approximately equidistantly spaced seating elements, each said unloader seating element having one said passage leading from said groove toward said inlet end of said valve body.

114. The valve seat assembly of claim 111, said unloader valve seal comprising a material that is sufficiently resilient to allow said unloader seating elements to impress and seal against said unloader valve seal when said unloader valve seal contacts said unloader seating elements.

115. The valve seat assembly of claim 111, said valve seat assembly including a piston hole through which said piston assembly extends to contact said unloader valve seal when said piston is at the first piston location, said piston hole permitting air to flow from said inlet end of said valve body toward said outlet end of said valve body when said piston is at a downstream piston location.

116. The valve seat assembly of claim 111, said unloader valve seal including a pressure hole through which air can flow from said inlet end of said valve body toward said outlet end of said valve body when said piston allows said unloader valve seal to contact said unloader seating elements.

117. A check valve to be installed between a compressor and an air receiver comprising:

an elongated valve body having an inlet end and an outlet end and a hole extending therethrough from said inlet end to said outlet end, said hole including a tapered portion including at least a first inner diameter and at least a second inner diameter that is larger than said first inner diameter, said first inner diameter of said tapered portion being closer to said inlet end of said valve body than said second inner diameter of said tapered portion;

a piston assembly mounted within said hole of said valve body, said piston assembly including a check valve seal, a piston, a first bumper, a dampener seal, and a piston spring, said piston spring normally biasing said piston toward said inlet end of said valve body to a first piston location;

a check valve seat being positioned in said hole of said valve body between said inlet end and said tapered position of said hole, said check valve seal being positioned so as to contact said check valve seat when said piston is at the first piston location;

said piston being movable from the first piston location to a plurality of downstream piston locations within said tapered portion of said hole when the compressor forces air from the air compressor through said inlet end of said valve body toward the air receiver, each of the downstream piston locations being further away from said inlet end of said valve body than the first piston location;

said piston assembly removing said check valve seal from contact with said check valve seat when said piston moves toward one of the downstream piston locations, thereby permitting air to move from the compressor through said inlet end of said valve body toward said outlet end of said valve body;

a first clearance space existing between said check valve seal and said tapered portion of said valve body when said piston moves to a first of the downstream piston locations, said first clearance space permitting a first level of air flow;

a second clearance space existing between said check valve seal and said tapered portion of said valve body when said piston moves to a second of the downstream piston locations, the second of the downstream piston locations being further away from said inlet end of said valve body than the first of the downstream piston locations, said second clearance space permitting a second level of air flow;

said second clearance space being greater than said first clearance space, the second level of air flow being greater than the first level of air flow;

a dampener cylinder having a first end, a second end, and an inside diameter, said first end of said dampener cylinder being positioned at the outlet end of said body, said second end of said dampener cylinder having a dampener orifice therethrough, said piston assembly extending into said dampener cylinder when said piston is at the first piston location;

said first bumper being positioned within said piston assembly so as to remain inside said hole of said valve body during operation of said check valve, said dampener seal being positioned within said piston assembly so as to remain inside said inside diameter of said dampener cylinder during operation of said check valve.

118. The check valve of claim 117 in which the downstream piston location of said piston is dependent on the volume output level of the air compressor wherein said piston moves to the first of the downstream locations when the air compressor has a first volume output level, said piston moving to the second of the downstream piston locations when the air compressor has a second volume output level, the second volume output level being greater than the first volume output level.

119. The check valve of claim 117 in which said dampener seal comprises a unidirectional seal positioned to allow air to flow between said inside diameter of said dampener cylinder and said piston assembly when said piston moves toward said outlet end of said valve body, said unidirectional seal also being positioned to restrict air from flowing between said inside diameter of said dampener cylinder and said piston assembly when said piston moves away from said outlet end of said valve body.

120. The check valve of claim 117 in which said dampener seal comprises an o-ring seal being positioned to restrict air from flowing between said inside diameter of said dampener cylinder and said piston assembly when said piston moves toward said outlet end of said valve body, said o-ring seal also being positioned to restrict air from flowing between said inside diameter of said dampener cylinder and said piston assembly when said piston moves away from said outlet end of said valve body.

121. The check valve of claim 117, said piston assembly including a ball positioned to reciprocate with said piston and to comprise said check valve seal, said ball contacting said check valve seat when said piston is in the first piston location.

122. The unloader check valve of claim 117 in which said piston assembly includes a second bumper mounted on said piston, said second bumper permitting a sufficient amount of clearance with said valve body to allow air pressure to flow from said check valve seal to said outlet end of said valve body.

123. The check valve of claim 117 in which said piston assembly includes a first bumper comprising a ball positioned to reciprocate with said piston, said first bumper permitting a sufficient amount of clearance with said valve body to allow air pressure to flow from said check valve seal to said outlet end of said valve body.

124. The check valve of claim 117 in which said piston assembly includes a ball positioned to reciprocate with said piston, said ball comprising said check valve seal and contacting said check valve seat when said piston is in the first piston location, said ball further comprising a first bumper that permits a sufficient amount of clearance with said valve body to allow air pressure to flow from said check valve seal to said outlet end of said valve body when said piston is in one of the downstream piston locations.

125. The check valve of claim 117 in which said piston is movable a greater distance from the first piston location with an increase in the magnitude of air pressure from the air compressor.

126. A check valve to be installed between a compressor and an air receiver comprising:

an elongated valve body having an inlet end and an outlet end and a hole extending therethrough from said inlet end to said outlet end, said hole including a tapered portion including at least a first inner diameter and at least a second inner diameter that is larger than said first inner diameter, said first inner diameter of said tapered portion being closer to said inlet end of said valve body than said second inner diameter of said tapered portion;

a piston assembly mounted within said hole of said valve body, said piston assembly including a check valve seal, a piston, a first bumper, a dampener seal, and a piston spring, said piston spring normally biasing said piston toward said inlet end of said valve body to a first piston location;

said check valve seal being positioned so as to contact said valve body when said piston is at the first piston location;

said piston being movable from the first piston location to a plurality of downstream piston locations within said tapered portion of said hole when the compressor forces air from the air compressor through said inlet end of said valve body toward the air receiver, each of the downstream piston locations being further away from said inlet end of said valve body than the first piston location;

said piston assembly removing said check valve seal from contact with said valve body when said piston moves toward one of the downstream piston locations, thereby permitting air to move from the compressor through said inlet end of said valve body toward said outlet end of said valve body;

a first clearance space existing between said check valve seal and said tapered portion of said valve body when said piston moves to a first of the downstream piston locations, said first clearance space permitting a first level of air flow;

a second clearance space existing between said check valve seal and said tapered portion of said valve body when said piston moves to a second of the downstream piston locations, the second of the downstream piston locations being further away from said inlet end of said valve body than the first of the downstream piston locations, said second clearance space permitting a second level of air flow;

said second clearance space being greater than said first clearance space, the second level of air flow being greater than the first level of air flow;

a dampener cylinder having a first end, a second end, and an inside diameter, said first end of said dampener cylinder being positioned at the outlet end of said body, said second end of said dampener cylinder having a dampener orifice therethrough, said piston assembly extending into said dampener cylinder when said piston is at the first piston location;

said first bumper being positioned within said piston assembly so as to remain inside said hole of said valve body during operation of said check valve, said dampener seal being positioned within said piston assembly so as to remain inside said inside diameter of said dampener cylinder during operation of said check valve.

127. The check valve of claim 126 in which the downstream piston location of said piston is dependent on the volume output level of the air compressor wherein said piston moves to the first of the downstream locations when the air compressor has a first volume output level, said piston moving to the second of the downstream piston locations when the air compressor has a second volume output level, the second volume output level being greater than the first volume output level.

128. The check valve of claim 126 in which said dampener seal comprises a unidirectional seal positioned to allow air to flow between said inside diameter of said dampener cylinder and said piston assembly when said piston moves toward said outlet end of said valve body, said unidirectional seal also being positioned to restrict air from flowing between said inside diameter of said dampener cylinder and said piston assembly when said piston moves away from said outlet end of said valve body.

129. The check valve of claim 126 in which said dampener seal comprises an o-ring seal being positioned to restrict air from flowing between said inside diameter of said dampener cylinder and said piston assembly when said piston moves toward said outlet end of said valve body, said o-ring seal also being positioned to restrict air from flowing between said inside diameter of said dampener cylinder and said piston assembly when said piston moves away from said outlet end of said valve body.

130. The check valve of claim 126 in which said piston assembly includes a ball positioned to reciprocate with said piston and to comprise said check valve seal, said ball contacting said valve body when said piston is in the first piston location.

131. The unloader check valve of claim 126 in which said piston assembly includes a second bumper mounted on said piston, said second bumper permitting a sufficient amount of clearance with said valve body to allow air pressure to flow from said check valve seal to said outlet end of said valve body.

132. The check valve of claim 126 in which said piston assembly includes a first bumper comprising a ball positioned to reciprocate with said piston, said first bumper permitting a sufficient amount of clearance with said valve body to allow air pressure to flow from said check valve seal to said outlet end of said valve body.

133. The check valve of claim 126 in which said piston assembly includes a ball positioned to reciprocate with said piston, said ball comprising said check valve seal and contacting said valve body when said piston is in the first piston location, said ball further comprising a first bumper that permits a sufficient amount of clearance with said valve body to allow air pressure to flow from said check valve seal to said outlet end of said valve body when said piston is in one of the downstream piston locations.

134. The check valve of claim 126 in which said piston is movable a greater distance from the first piston location with an increase in the magnitude of air pressure from the air compressor.

* * * * *